United States Patent
Han et al.

(10) Patent No.: US 11,513,652 B2
(45) Date of Patent: Nov. 29, 2022

(54) DISPLAY DEVICE

(71) Applicant: Samsung Display Co., LTD., Yongin-si (KR)

(72) Inventors: Jeongyun Han, Hwaseong-si (KR); Jong-Hwa Kim, Yongin-si (KR); Kyungsu Lee, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/185,834

(22) Filed: Feb. 25, 2021

(65) Prior Publication Data

US 2021/0389845 A1 Dec. 16, 2021

(30) Foreign Application Priority Data

Jun. 16, 2020 (KR) .................. 10-2020-0072940

(51) Int. Cl.
*G06F 3/044* (2006.01)

(52) U.S. Cl.
CPC .......... *G06F 3/0448* (2019.05); *G06F 3/0445* (2019.05); *G06F 3/0446* (2019.05); *G06F 2203/04111* (2013.01)

(58) Field of Classification Search
CPC .... G06F 3/0448; G06F 3/0445; G06F 3/0446; G06F 2203/04111
See application file for complete search history.

(56) References Cited

U.S. PATENT DOCUMENTS

| | | | |
|---|---|---|---|
| 9,665,196 B2 | 5/2017 | Gwon et al. | |
| 2015/0084912 A1* | 3/2015 | Seo | G02F 1/13338 345/174 |
| 2016/0291781 A1* | 10/2016 | He | G06F 3/0443 |
| 2018/0348929 A1* | 12/2018 | Rhe | G06F 3/0446 |
| 2019/0214596 A1 | 7/2019 | Park | |
| 2019/0302942 A1 | 10/2019 | Kim et al. | |
| 2019/0369787 A1 | 12/2019 | Park et al. | |
| 2020/0064968 A1 | 2/2020 | Kim et al. | |
| 2020/0142525 A1 | 5/2020 | Han et al. | |

FOREIGN PATENT DOCUMENTS

| | | |
|---|---|---|
| KR | 10-1731172 | 4/2017 |
| KR | 10-2019-0085202 | 7/2019 |
| KR | 10-2019-0114063 | 10/2019 |
| KR | 10-2019-0137192 | 12/2019 |
| KR | 10-2020-0019305 | 2/2020 |

* cited by examiner

*Primary Examiner* — Amit Chatly
(74) *Attorney, Agent, or Firm* — H.C. Park & Associates, PLC

(57) ABSTRACT

A display device includes a display layer on which a display area and a non-display area adjacent to the display area are defined and a sensor layer on which a plurality of sensor units are defined. The plurality of sensor units includes a first sensor unit overlapping the display area and a second sensor unit overlapping the display area and the non-display area. The second sensor unit includes a first portion and a second portion expanded from the first portion, and the first portion has a shape that is the same as a shape of which a portion is removed from the first sensor unit, and a width of the second sensor unit in a first direction is greater than a width of the first sensor unit in the first direction.

20 Claims, 23 Drawing Sheets

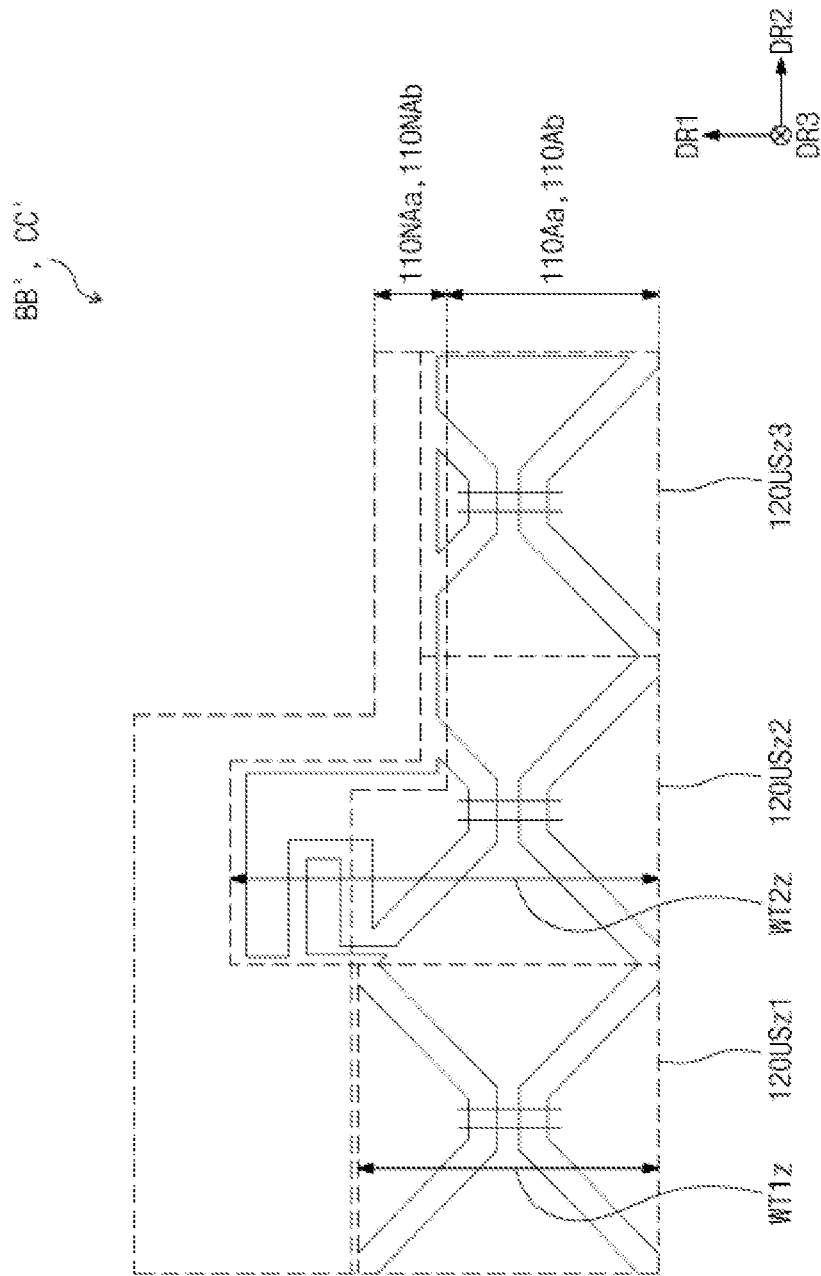

DISPLAY DEVICE

CROSS-REFERENCE TO RELATED APPLICATION

This application claims priority from and the benefit of Korean Patent Application No. 10-2020-0072940, filed on Jun. 16, 2020, which is hereby incorporated by reference for all purposes as if fully set forth herein.

BACKGROUND

Field

Embodiments of the inventive concepts relate generally to a display device including a sensor layer having improved sensing sensitivity.

Discussion of the Background

A display device may include a display layer that displays an image and a sensor layer that senses an external input. The sensor layer may include a plurality of sensor units. Recently, as display devices having various shapes of display areas have been developed, a portion of the shapes of the plurality of sensor units may have a shape different from that of each of other sensor units.

The above information disclosed in this Background section is only for understanding of the background of the inventive concepts, and, therefore, it may contain information that does not constitute prior art.

SUMMARY

Devices constructed according to embodiments of the inventive concepts are capable of providing a display device including a sensor layer having improved sensing sensitivity.

Additional features of the inventive concepts will be set forth in the description which follows, and in part will be apparent from the description, or may be learned by practice of the inventive concepts.

One or more embodiments of the inventive concepts provide a display device including a display layer on which a display area and a non-display area adjacent to the display area are defined and a sensor layer on which a plurality of sensor units are defined. In an embodiment, the plurality of sensor units may include a first sensor unit overlapping the display area and a second sensor unit overlapping the display area and the non-display area, wherein the second sensor unit may include a first portion and a second portion expanded from the first portion, and the first portion may have a shape that is the same as a shape of a portion of the first sensor unit, and a width of the second sensor unit in a first direction may be greater than a width of the first sensor unit in the first direction.

In an embodiment, a hole may be defined in the sensor layer, and the first portion of the second sensor unit may include an edge extending along a shape of the hole.

In an embodiment, the first portion may overlap the display area, and the second portion may overlap the non-display area.

In an embodiment, a width of the second senor unit in a second direction crossing the first direction may be greater than a width of the first sensor unit in the second direction.

In an embodiment, the sensor layer may further include a plurality of sensing lines disposed on the non-display area, and the number of sensing lines facing the first sensor unit among the plurality of sensing lines may be greater than the number of sensing lines facing the second sensor unit among the plurality of sensing lines.

In an embodiment, the sensor layer may further include a dummy pattern disposed on the non-display area, and the dummy pattern may have a shape similar to that of the second portion.

In an embodiment, each of the first portions of the first sensor unit and the second sensor unit may include a bridge pattern, a first sensing pattern contacting the bridge pattern, a second sensing pattern contacting the bridge pattern, and a third sensing pattern spaced apart from the first sensing pattern and the second sensing pattern, and the third sensing pattern may include a first portion overlapping the bridge pattern, a second portion extending from the first portion and facing the first sensing pattern and the second sensing pattern, and a third portion extending from the first portion and facing the first sensing pattern and the second sensing pattern.

In an embodiment, the second portion of the second sensor unit may include a first protrusion extending from the first sensing pattern toward an area overlapping the non-display area, a second protrusion extending from the second portion toward an area, which overlaps the non-display area, and facing the first protrusion, and a third protrusion extending from the third portion toward an area, which overlaps the non-display area, and facing the first protrusion.

In an embodiment, the second protrusion may be disposed between the first protrusion and the first sensing pattern, and the third protrusion may be disposed between the first protrusion and the first sensing pattern.

In an embodiment, each of the first sensor unit and the second sensor unit may include a bridge pattern, a first sensing pattern contacting the bridge pattern, a second sensing pattern contacting the bridge pattern, and a third sensing pattern spaced apart from the first sensing pattern and the second sensing pattern, the third sensing pattern may include a first portion overlapping the bridge pattern, a second portion extending from the first portion to face the first sensing pattern and the second sensing pattern, and a third portion extending from the first portion to face the first sensing pattern and the second sensing pattern, and a portion of the first sensing pattern of the second sensor unit, a portion of the second portion of the second sensor unit, and a portion of the third portion of the second sensor unit may overlap the non-display area.

In an embodiment, the plurality of sensor units may include a third sensor unit overlapping the display area and the non-display area, the third sensor unit may include a third portion and a fourth portion expanded from the third portion, the third portion may have a shape that is the same as a shape of a portion of the first sensor unit, the first portion of the second sensor unit may have a surface area greater than that of the third portion of the third sensor unit, and the second portion of the second sensor unit may have a surface area less than that of the fourth portion of the third sensor unit.

In an embodiment, a boundary between the display area and the non-display area may include a first boundary portion and a second boundary portion connected to the first boundary portion, the first boundary portion extends in a predetermined direction, and the second boundary portion may be bent from the first boundary portion toward a central portion of the display area.

In an embodiment, the second sensor unit may overlap the second boundary portion, the first portion of the second sensor unit may overlap the display area, and the second portion of the second sensor unit may overlap the non-display area.

In an embodiment, the display area may include a first display area and a second display area protruding and extending from the first display area in the first direction, and a width of the first display area in a second direction crossing the first direction may be greater than that of the second display area in the second direction.

In an embodiment, the second sensor unit may overlap at least one of the first display area or the second display area.

In one or more embodiments of the inventive concepts, a display device includes: a display layer on which a display area and a non-display area adjacent to the display area are defined and a sensor layer disposed on the display layer and including a plurality of sensing electrodes. In an embodiment, a transmission area that is completely surrounded by the display area may be defined on the display layer and the sensor layer, and a first sensing electrode adjacent to the transmission area among the plurality of sensing electrodes may overlap the display area and the non-display area.

In an embodiment, a portion of an edge of the first sensing electrode may have a shape corresponding to that of the transmission area.

In an embodiment, a second sensing electrode spaced apart from the transmission area among the plurality of sensing electrodes may have a length less than that of the first sensing electrode, and each of the first sensing electrode and the second sensing electrode may extend along a first direction, and the first sensing electrode and the second sensing electrode may be spaced apart from each other in a second direction crossing the first direction.

In an embodiment, the sensor layer may further include a dummy pattern facing the second sensing electrode and overlapping the non-display area.

In one or more embodiments of the inventive concepts, a display device includes a display layer on which a display area and a non-display area adjacent to the display area are defined and a sensor layer which is disposed on the display layer and on which a plurality of sensor units configured to sense an input are defined. In an embodiment, the plurality of sensor units may include: a first sensor unit overlapping the display area; and a second sensor unit overlapping the display area and the non-display area, wherein a hole is defined in the display layer and the sensor layer, the first sensor unit may be spaced apart from the hole with the second sensor unit therebetween, and the second sensor unit may include an edge extending along a shape of the hole.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings are included to provide a further understanding of the inventive concepts, and are incorporated in and constitute a part of this specification, illustrate embodiments of the inventive concept, and together with the description serve to explain the inventive concepts.

FIG. 22 is an enlarged plan view illustrating a portion corresponding to an area CC' of FIGS. 20 and 21.

DETAILED DESCRIPTION

Figure 1:
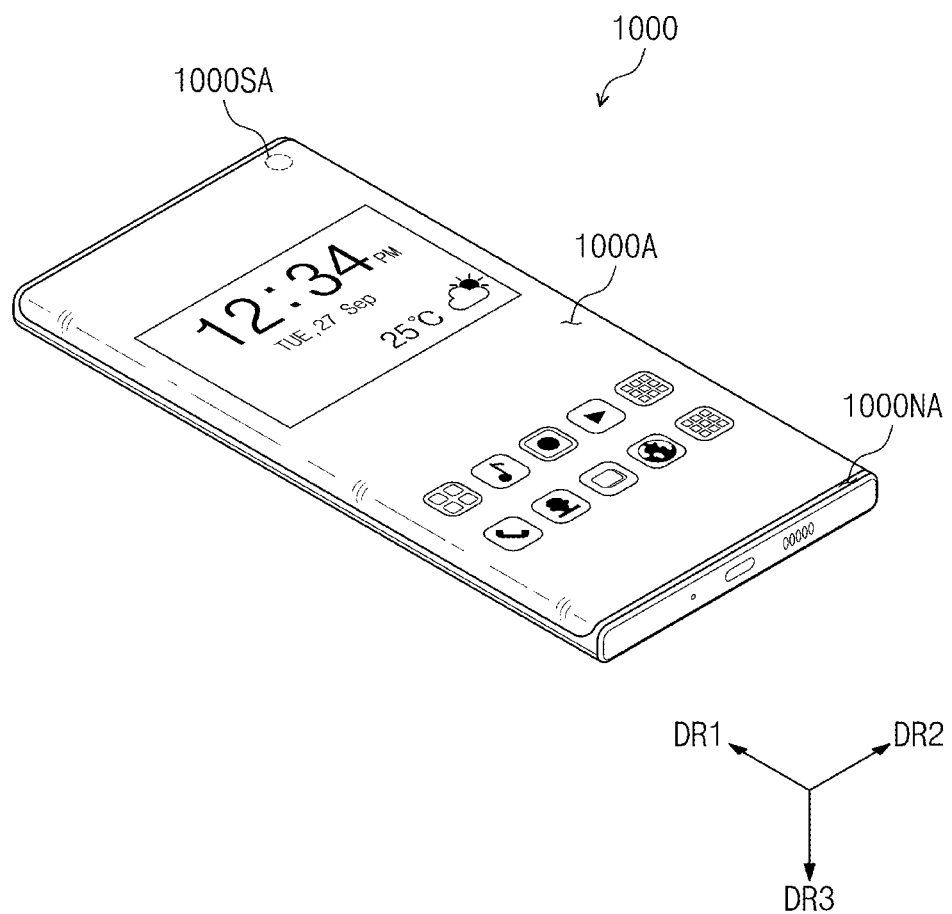
FIG. 1 is a perspective view of a display device according to an embodiment of the inventive concepts.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the x, y, and z-axes, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, exemplary embodiments of the inventive concepts will be described with reference to the accompanying drawings.

FIG. 1 is a perspective view of a display device according to an embodiment of the inventive concepts.

Referring to FIG. 1, a display device 1000 may be a device activated according to an electrical signal. For example, the display device 1000 may be a mobile phone, a tablet PC, a car navigation system, a game console, or a wearable device, but is not limited thereto. FIG. 1 illustrates an example in which the display device 1000 is a mobile phone.

A display area 1000A and a non-display area 1000NA may be defined on the display device 1000. The non-display area 1000NA may be a peripheral area of the display area 1000A.

The display device 1000 may display an image through the display area 1000A. The display area 1000A may include a plane defined by a first direction DR1 and a second direction DR2. The display area 1000A may further include curved surfaces that are respectively bent from at least two sides of the plane. However, the shape of the display area 1000A is not limited thereto. For example, the display area 1000A may include only the plane. Alternatively, the display area 1000A may further include at least two curved surfaces, for example, four curved surfaces that are respectively bent from four sides.

A sensor area 1000SA may be defined on the display area 1000A of the display device 1000. The sensor area 1000SA may be completely surrounded by the display area 1000A. An electronic module, for example, a camera module or a proximity illuminance sensor, may be disposed on an area overlapping the sensor area 1000SA. The electronic module may receive an external input transmitted through the sensor area 1000SA or may provide an output through the sensor area 1000SA.

In FIG. 1, one sensor area 1000SA is illustrated as an example, but the number of sensor areas 1000SA is not limited thereto. Also, although the sensor area 1000SA is illustrated in a circular shape in FIG. 1, the shape of the sensor area 1000SA is not limited thereto.

A thickness direction of the display device 1000 may be parallel to a third direction DR3 crossing the first direction DR1 and the second direction DR2. Thus, a front surface (or top surface) and a rear surface (or bottom surface) of each of members constituting the display device 1000 may be defined based on the third direction DR3.

Figure 2:
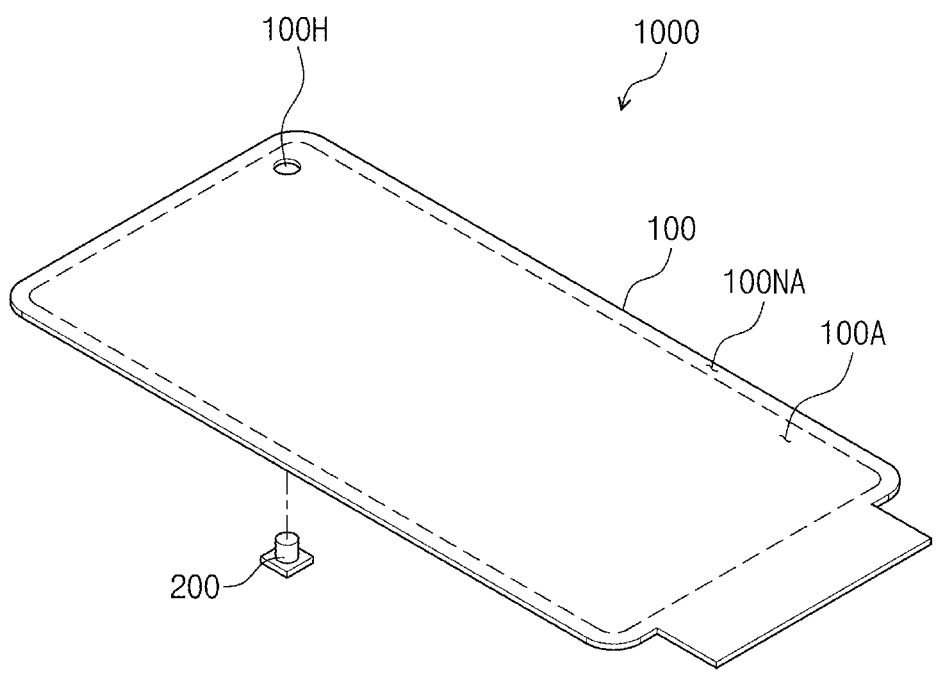
FIG. 2 is an exploded perspective view illustrating some of constituents of the display device according to an embodiment of the inventive concepts.
Figure 2:
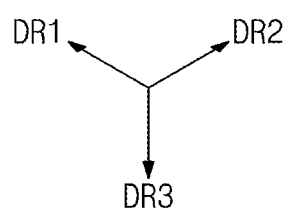

FIG. 2 is an exploded perspective view illustrating some of constituents of the display device according to an embodiment of the inventive concepts.

Referring to FIG. 2, the display device 1000 may include a display panel 100 and an electronic module 200. The display panel 100 may be a constituent that generates an image and senses an input applied from the outside. The electronic module 200 is disposed under the display panel 100 and may be, for example, the camera module.

A display area 100A and a non-display area 100NA may be defined on the display panel 100. The display area 100A may correspond to the display area 1000A illustrated in FIG. 1, and the non-display area 100NA may correspond to the non-display area 1000NA illustrated in FIG. 1.

A portion of the display panel 100 overlapping the electronic module 200 may be removed to define a hole 100H. The hole 100H may be provided by removing all or at least a portion of the display panel 100 in a thickness direction of the display panel 100. An external input received to the electronic module 200 or an output from the electronic module 200 may be transmitted through the hole 100H. Thus, the hole 100H may be referred to as a transmission area.

Figure 3A:
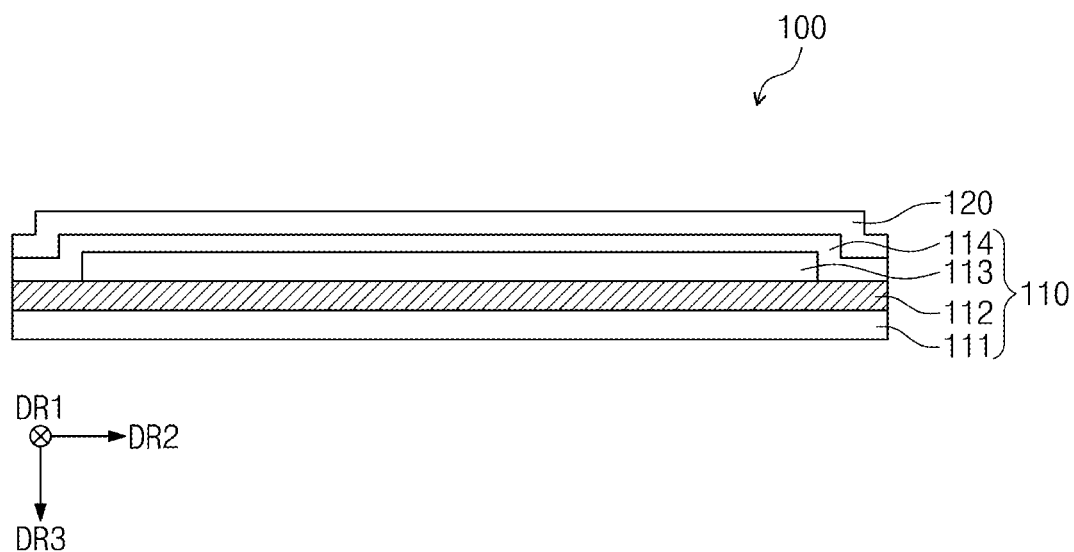
FIG. 3A is a schematic cross-sectional view of a display panel according to an embodiment of the inventive concepts.

FIG. 3A is a cross-sectional view of the display panel according to an embodiment of the inventive concepts.

Referring to FIG. 3A, the display panel 100 may include a display layer 110 and a sensor layer 120.

The display layer 110 may be configured to substantially generate an image. The display layer 110 may be an emission-type display layer, for example, the display layer 110 may be an organic light emitting display layer, a quantum dot display layer, or a micro LED display layer.

The display layer 110 may include a base layer 111, a circuit layer 112, a light emitting element layer 113, and an encapsulation layer 114.

The base layer 111 may include a synthetic resin film. The synthetic resin layer may include a thermosetting resin. The base layer 111 may have a multi-layered structure. For example, the base layer 111 may have a three-layered structure constituted by a synthetic resin layer, an adhesive layer, and a synthetic resin layer. Particularly, the synthetic resin layer may be a polyimide resin layer, and the material thereof is not particularly limited. The synthetic resin layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, or a perylene-based resin. In addition, the base layer 111 may include a glass substrate or an organic/inorganic composite substrate.

The circuit layer 112 may be disposed on the base layer 111. The circuit layer 112 may include an insulating layer, a semiconductor pattern, a conductive pattern, and a signal line. The insulating layer, the semiconductor layer, and the conductive layer may be formed on the base layer 111 in a manner such as coating or vapor deposition, and then, the insulating layer, the semiconductor layer, and the conductive layer may be selectively patterned through a plurality of photolithography processes. Thereafter, the semiconductor pattern, the conductive pattern, and the signal line provided in the circuit layer 112 may be provided.

A light emitting element layer 113 may be disposed on the circuit layer 112. The light emitting element layer 113 may include a light emitting element. For example, the light emitting element layer 113 may include an organic light emitting material, quantum dots, quantum rods, or micro LEDs.

An encapsulation layer 114 may be disposed on the light emitting element layer 113. The encapsulation layer 114 may include an inorganic layer, an organic layer, and an inorganic layer, which are sequentially laminated, but layers constituting the encapsulation layer 114 are not limited thereto.

The inorganic layers may protect the light emitting element layer 113 against moisture and oxygen, and the organic layer may protect the light emitting element layer 113 against foreign substances such as dust particles. The inorganic layers may include a silicon nitride layer, a silicon oxy nitride layer, a silicon oxide layer, a titanium oxide layer, or an aluminum oxide layer. The organic layer may include an acrylic-based organic layer, but embodiments of the inventive concepts are not limited thereto.

The sensor layer 120 may be disposed on the display layer 110. The sensor layer 120 may sense an external input applied from the outside. The external input may be a user's input. The user's input may include various types of external inputs such as a portion of user's body, light, heat, a pen, a pressure, or the like.

The sensor layer 120 may be disposed on the display layer 110 through a continuous process. In this case, the sensor layer 120 may be expressed as being directly disposed on the display layer 110. The direct disposition may mean that a third component is not disposed between the sensor layer 120 and the display layer 110. That is, a separate adhesive member may not be disposed between the sensor layer 120 and the display layer 110.

Alternatively, the sensor layer 120 may be bonded to the display layer 110 through an adhesive member. The adhesive member may include a common adhesive or an adhesive agent.

Figure 3B:
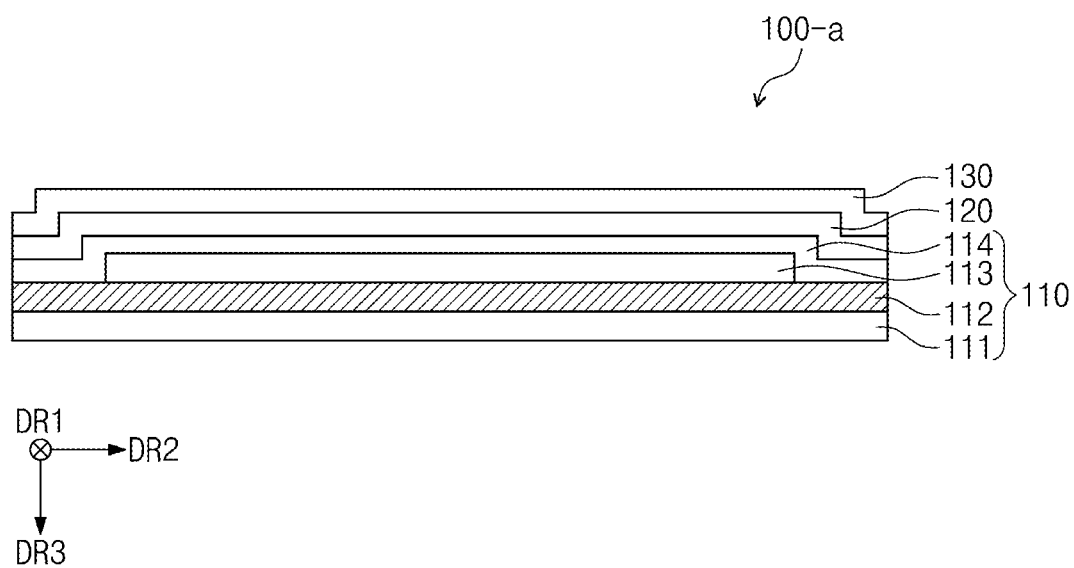
FIG. 3B is a schematic cross-sectional view of a display panel according to an embodiment of the inventive concepts.

FIG. 3B is a cross-sectional view of a display panel according to an embodiment of the inventive concepts.

Referring to FIG. 3B, a display panel 100-a may further include an anti-reflection layer 130 when compared with the display panel 100 described in FIG. 3A.

The anti-reflection layer 130 may reduce reflectance of external light incident from the outside of the display panel 100-a.

The anti-reflection layer 130 may be disposed on the sensor layer 120. However, the position of the anti-reflection layer 130 is not limited thereto. For example, the anti-reflection layer 130 may be disposed between the sensor layer 120 and the display layer 110.

The anti-reflection layer 130 according to an embodiment of the inventive concepts may include color filters. The color filters may have a predetermined arrangement. The arrangement of the color filters may be determined in consideration of emission colors of the pixels included in the display layer 110. Also, the anti-reflection layer 130 may further include a black matrix adjacent to the color filters.

The anti-reflection layer 130 according to an embodiment of the inventive concepts may include a destructive interference structure. For example, the destructive interference structure include first reflection layer and a second reflection layer, which are disposed on layers different from each other. First reflected light and second reflected light, which are respectively reflected from the first reflection layer and the second reflection layer, may destructively interfere with each other, and thus, the external light may be reduced in reflectance.

The anti-reflection layer 130 according to an embodiment of the inventive concepts may include a stretchable synthetic resin film. For example, the anti-reflection layer 130 may be provided by dyeing an iodine compound to a polyvinyl alcohol film (PVA film).

Figure 3C:
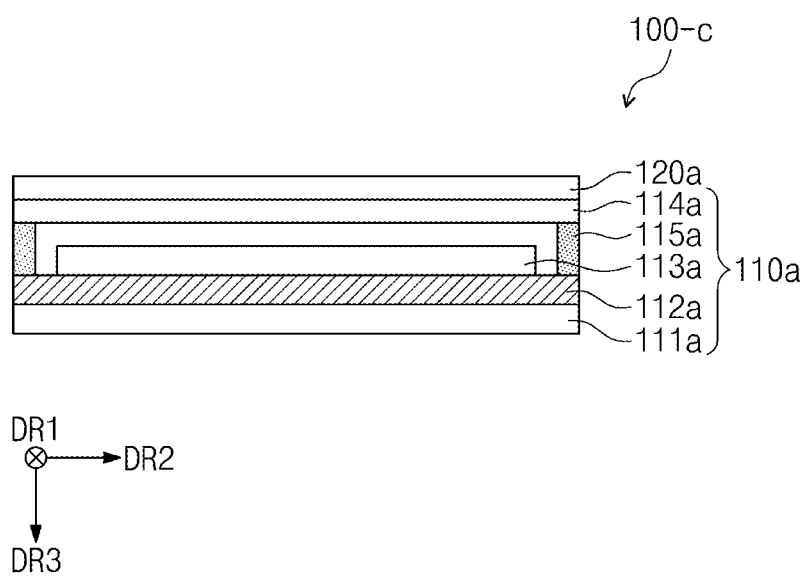
FIG. 3C is a schematic cross-sectional view of a display panel according to an embodiment of the inventive concepts.

FIG. 3C is a schematic cross-sectional view of a display panel according to an embodiment of the inventive concepts.

Referring to FIG. 3C, a display panel 100-c may include a display layer 110a and a sensor layer 120a.

The display layer 110a may include a base substrate 111a, a circuit layer 112a, a light emitting element layer 113a, an encapsulation substrate 114a, and a coupling member 115a.

The coupling member 115a may be disposed between the base substrate 111a and the encapsulation substrate 114a.

The coupling member 115a may include an inorganic material or an organic material. For example, the inorganic material may include a frit seal, and the organic material may include a photocurable resin or a photoplastic resin. However, the material forming the coupling member 115a is not limited to the above example.

The sensor layer 120a may be disposed on the encapsulation substrate 114a. The sensor layer 120a may be directly disposed on the encapsulation substrate 114a. Alternatively, the sensor layer 120a may be formed on the base layer and then coupled to the encapsulation substrate 114a through an adhesive member.

Figure 4:
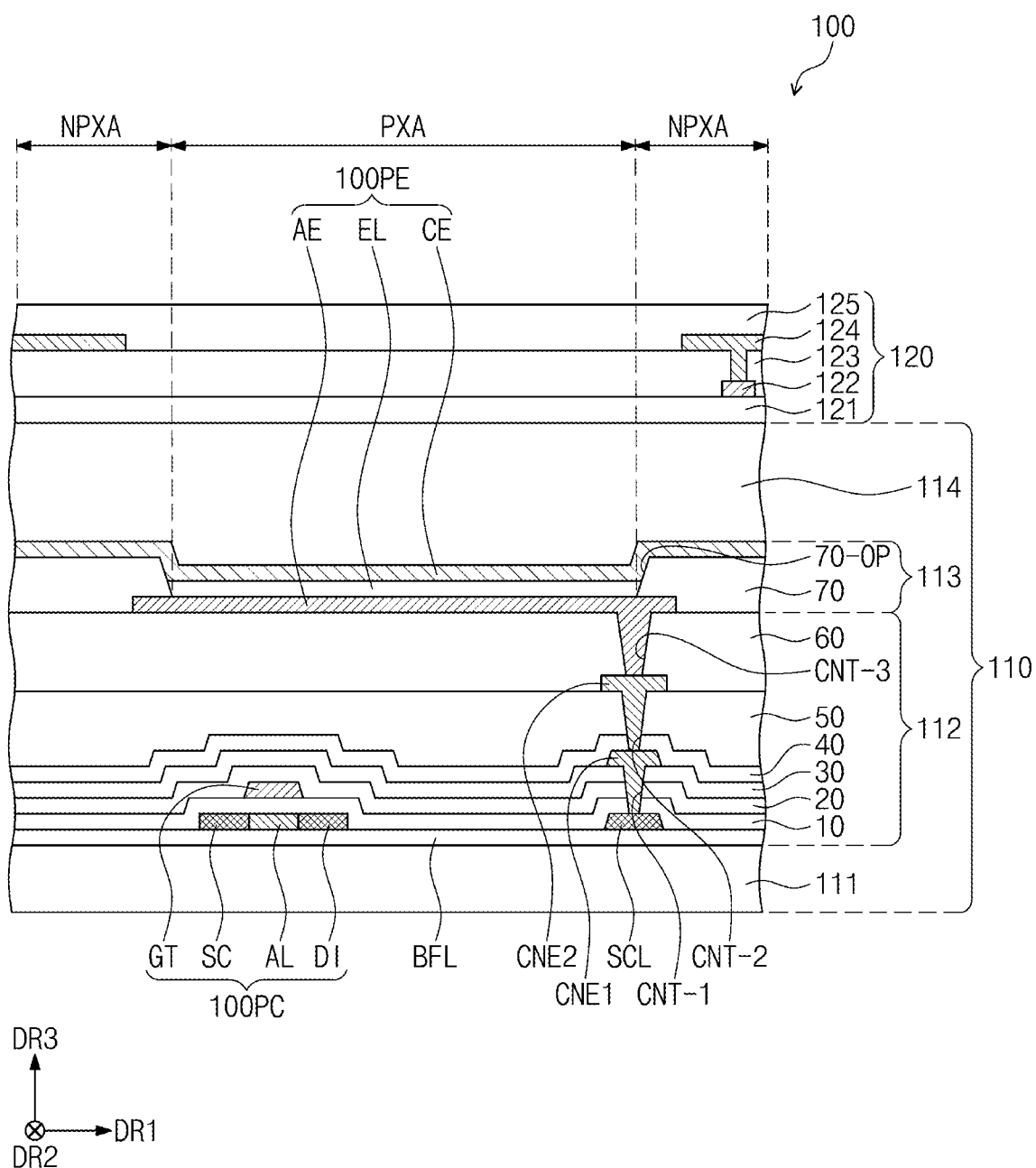
FIG. 4 is a cross-sectional view of the display device according to an embodiment of the inventive concepts.

FIG. 4 is a cross-sectional view of the display device according to an embodiment of the inventive concepts.

Referring to FIG. 4, the display layer 110 may include a plurality of insulating layers, a semiconductor pattern, a conductive pattern, a signal line, and the like. The insulating layer, the semiconductor layer, and the conductive layer may be provided in a manner such as coating, deposition, and the like. Thereafter, the insulating layer, the semiconductor layer, and the conductive layer may be selectively patterned in a photolithography manner. In this manner, the semiconductor pattern, the conductive pattern, the signal line, and the like, which are provided in the circuit layer 112 and the light emitting element layer 113 may be provided. Thereafter, the encapsulation layer 114 covering the light emitting element layer 113 may be provided.

At least one inorganic layer may be disposed on a top surface of the base layer 111. The inorganic layer may include at least one of aluminum oxide, titanium oxide, silicon oxide, silicon nitride, silicon oxynitride, zirconium oxide, or hafnium oxide. The inorganic layer may be provided as a multilayer. The multilayered inorganic layer may constitute a barrier layer and/or a buffer layer. In this embodiment, the display layer 110 is illustrated as including a buffer layer BFL.

The buffer layer BFL may improve bonding force between the base layer 111 and the semiconductor pattern. The buffer layer BFL may include a silicon oxide layer and a silicon nitride layer, and the silicon oxide layer and the silicon nitride layer may be alternately stacked.

The semiconductor pattern may be disposed on the buffer layer BFL. The semiconductor pattern may include polysilicon. However, embodiments of the inventive concepts are not limited thereto. For example, the semiconductor pattern may include amorphous silicon or oxide semiconductor.

FIG. 4 illustrates merely a portion of the semiconductor pattern. For example, the semiconductor pattern may be further disposed on other areas. The semiconductor pattern may be arranged in a specific rule over pixels. The semiconductor pattern has different electrical properties depending on whether the semiconductor pattern is doped. The semiconductor pattern may include a first region having high conductivity and a second region having low conductivity. The first region may be doped with an N-type dopant or a P-type dopant. A P-type transistor may include a first region doped with the P-type dopant, and an N-type transistor may include a first region doped with the N-type dopant.

The first region may have conductivity greater than that of the second region and may substantially act as an electrode or a signal line. The second region may substantially correspond to an active area or a channel of the transistor. That is to say, a portion of the semiconductor pattern may be a channel of the transistor, another portion may be a source or drain of the transistor, and further another portion may be a connection electrode or a connection signal line.

Each of the pixels may have an equivalent circuit including seven transistors, one capacitor, and a light emitting element, and an equivalent circuit diagram of the pixel may be modified in various forms. In FIG. 4, one transistor 100PC and a light emitting element 100PE included in the pixel are exemplarily illustrated.

A source SC, a channel AL, and a drain DI of the transistor 100PC may be provided from the semiconductor pattern. The source SC and the drain DI may extend in opposite directions from the channel AL on a cross-section. FIG. 4 illustrates a portion of a connection signal line SCL formed from the semiconductor pattern. Although not particularly shown, the connection signal line SCL may be connected to the drain DI of the transistor 100PC on the plane.

The first insulating layer 10 may be disposed on the buffer layer BFL. The first insulating layer 10 commonly overlaps the plurality of pixels PX to cover the semiconductor pattern. The first insulating layer 10 may include an inorganic layer and/or an organic layer and have a single-layered or multilayered structure. The first insulating layer 10 may include at least one of aluminum oxide, titanium oxide, silicon oxide, silicon nitride, silicon oxynitride, zirconium oxide, or hafnium oxide. In this embodiment, the first insulating layer 10 may include a single-layered silicon oxide layer. The insulating layer of the circuit layer 112, which will be described later, as well as the first insulating layer 10 may be an inorganic layer and/or an organic layer and may have a single-layered or a multilayered structure. The inorganic layer may include at least one of the above-described materials, but is not limited thereto.

A gate GT of the transistor 100PC is disposed on the first insulating layer 10. The gate GT may be a portion of a metal pattern. The gate GT overlaps the channel AL. In the process of doping the semiconductor pattern, the gate GT may function as a mask.

The second insulating layer 12 may be disposed on the first insulating layer 10 to cover the gate GT. The second insulating layer 12 may commonly overlap the pixels. The second insulating layer 12 may be an inorganic layer and/or an organic layer and have a single-layered or multilayered structure. In this embodiment, the second insulating layer 12 may be a single-layered silicon oxide or silicon nitride layer.

The third insulating layer 30 may be disposed on the second insulating layer 12. In this embodiment, the third insulating layer 30 may be a single-layered silicon oxide layer or silicon nitride layer.

A first connection electrode CNE1 may be disposed on the third insulating layer 30. The first connection electrode CNE1 may be connected to the signal line SCL through a contact hole CNT-1 passing through the first to third insulating layers 10 to 30.

A fourth insulating layer 40 may be disposed on the third insulating layer 30. The fourth insulating layer 40 may be a single-layered silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 passing through the fourth insulating layer 40 and the fifth insulating layer 50.

A sixth insulating layer 60 may be disposed on the fifth insulating layer 50 to cover the second connection electrode CNE2. The sixth insulating layer 60 may be an organic layer.

A light emitting element layer 113 including a light emitting element 100PE may be disposed on the circuit layer 112. The light emitting element 100PE may include a first electrode AE, an emission layer EL, and a second electrode CE.

The first electrode AE may be disposed on the sixth insulating layer 60. The first electrode AE may be connected to the second connection electrode CNE2 through a contact hole CNT-3 passing through the sixth insulating layer 60.

A pixel defining layer 70 may be disposed on the sixth insulating layer 60 to cover a portion of the first electrode AE. An opening 70-OP is defined in the pixel defining layer 70. The opening 70-OP of the pixel defining layer 70 exposes at least a portion of the first electrode AE.

As illustrated in FIG. 4, the active area 100A (see FIG. 2) may include an emission area PXA and a non-emission area NPXA adjacent to the emission area PXA. A non-emission area NPXA may surround the emission area PXA. In this embodiment, an emission area PXA may be defined to correspond to a portion of an area of the first electrode AE, which is exposed by the opening 70-OP.

The emission layer EL may be disposed on the first electrode AE. The light emitting layer EL may be disposed on an area corresponding to the opening 70-OP. That is, the emission layer EL may be disposed to be separated from each of the pixels. When the emission layer EL is disposed to be separated from each of the pixels, each of the emission layers EL may emit light having at least one of blue, red, or green color. However, embodiments of the inventive concepts are not limited thereto. For example, the emission layer EL may be commonly provided to be connected to the pixels. In this case, the emission layer EL may provide blue light or white light.

The second electrode CE may be disposed on the emission layer EL. The second electrode CE may have an integrated shape and commonly disposed on the plurality of pixels.

Although not illustrated, a hole control layer may be disposed between the first electrode AE and the emission layer EL. The hole control layer may be commonly disposed on the emission area PXA and the non-emission area NPXA. The hole control layer may include a hole transport layer and may further include a hole injection layer. An electron control layer may be disposed between the emission layer EL and the second electrode CE. The electron control layer may include an electron transport layer and may further include an electron injection layer. The hole control layer and the electron control layer may be commonly formed in the plurality of pixels by using an open mask.

An encapsulation layer 114 may be disposed on the light emitting element layer 113. The encapsulation layer 114 may protect the light emitting element layer 113 against foreign substances such as moisture, oxygen, and dust particles.

The sensor layer 120 may include a base layer 121, a first conductive layer 122, a sensing insulating layer 123, a second conductive layer 124, and a cover insulating layer 125.

The base layer 121 may be an inorganic layer including any one of silicon nitride, silicon oxynitride, and silicon oxide. Alternatively, the base layer 121 may be an organic layer including an epoxy resin, an acrylic resin, or an imide-based resin. Each of the base layer 121 may have a single-layered structure or a multilayered structure in which a plurality of layers are laminated in the third direction DR3.

Each of the first conductive layer 122 and the second conductive layer 124 may have a single-layered structure or a multilayered structure in which a plurality of layers are laminated in the third directional axis DR3.

The conductive layer having the single-layered structure may include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), indium zinc tin oxide (IZTO), and the like. In addition, the transparent conductive layer may include conductive polymers such as PEDOT, metal nanowires, graphene, and the like.

The conductive layer having the multilayered structure may include metal layers. The metal layers may have a three-layered structure of titanium/aluminum/titanium. The conductive layer having the multilayered structure may include at least one metal layer and at least one transparent conductive layer.

The sensor layer 120 may acquire information on an external input through a change in mutual capacitance or acquire information on an external input through a change in self-capacitance. For example, the sensor layer 120 may include sensing patterns and bridge patterns. At least some of the sensing patterns and bridge patterns may be provided in the first conductive layer 122, and at least some of the sensing patterns and bridge patterns may be provided in the second conductive layer 124.

At least one of the sensing insulating layer 123 or the cover insulating layer 125 may include an inorganic layer. The inorganic layer may include at least one of aluminum oxide, titanium oxide, silicon oxide, silicon nitride, silicon oxynitride, zirconium oxide, or hafnium oxide.

At least one of the sensing insulating layer 123 or the cover insulating layer 125 may include an organic layer. The organic layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin.

Figure 5:
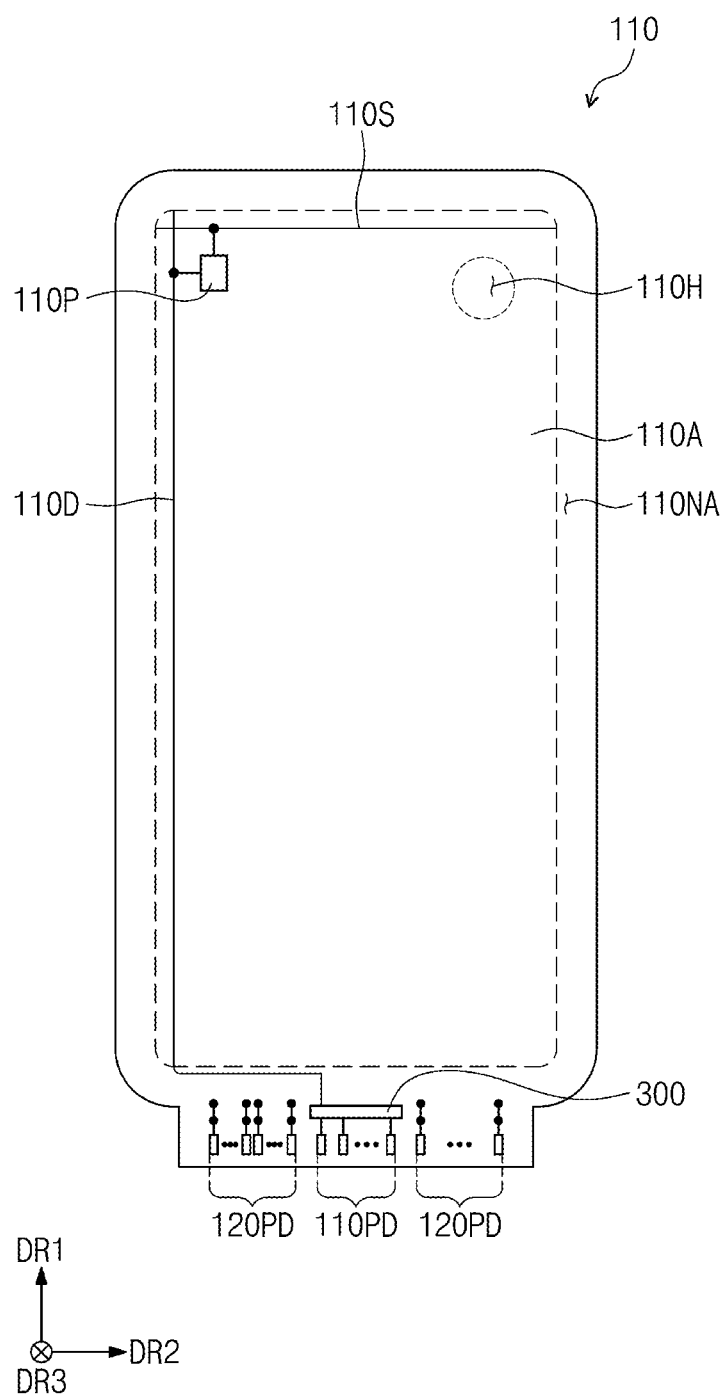
FIG. 5 is a plan view of a display layer according to an embodiment of the inventive concepts.

FIG. 5 is a plan view of the display layer 110 according to an embodiment of the inventive concepts.

Referring to FIG. 5, a display area 110A and a non-display area 110NA may be defined on the display layer 110. The display area 110A may be an area displaying an image. The non-display area 110NA may surround the display area 110A.

The display layer 110 may include a pixel 110P, a scan line 110S, a data line 110D, display pads 110PD, and sensing pads 120PD. The pixel 110P may be disposed on the display area 110A. The scan line 110S and the data line 110D may be electrically connected to the pixel 110P to provide a signal for driving the pixel 110P. Although one pixel 110P, one scan line 110S, and one data line 110D are illustrated in FIG. 5, all of the above constituents may be provided in plurality.

A hole 110H may be defined in the display area 110A of the display layer 110. The hole 110H may be defined in the display area 110A. When viewed in the third direction DR3 or in the thickness direction of the display layer 110, the hole 110H may be surrounded by the display area 110A. The hole 110H may be provided by removing all of the constituents in the third direction DR3 of the display layer 110 or may be provided by removing some of the constituents in the third direction DR3 of the display layer 110.

The driving chip 300 may be disposed on the non-display area 110NA. The data line 110D may be electrically connected to one of the display pads 110PD via the driving chip 300. FIG. 5 illustrates that the driving chip 300 is mounted on the display layer 110, but is not limited thereto. For example, the driving chip 300 may be mounted on a printed circuit film, and the printed circuit film may be attached to the display layer 110.

The sensing pads 120PD may be disposed on the non-display area 110NA.

However, this is a merely an example. For example, the sensing pads 120PD may be disposed on the sensor layer 120 to be described later.

Figure 6:
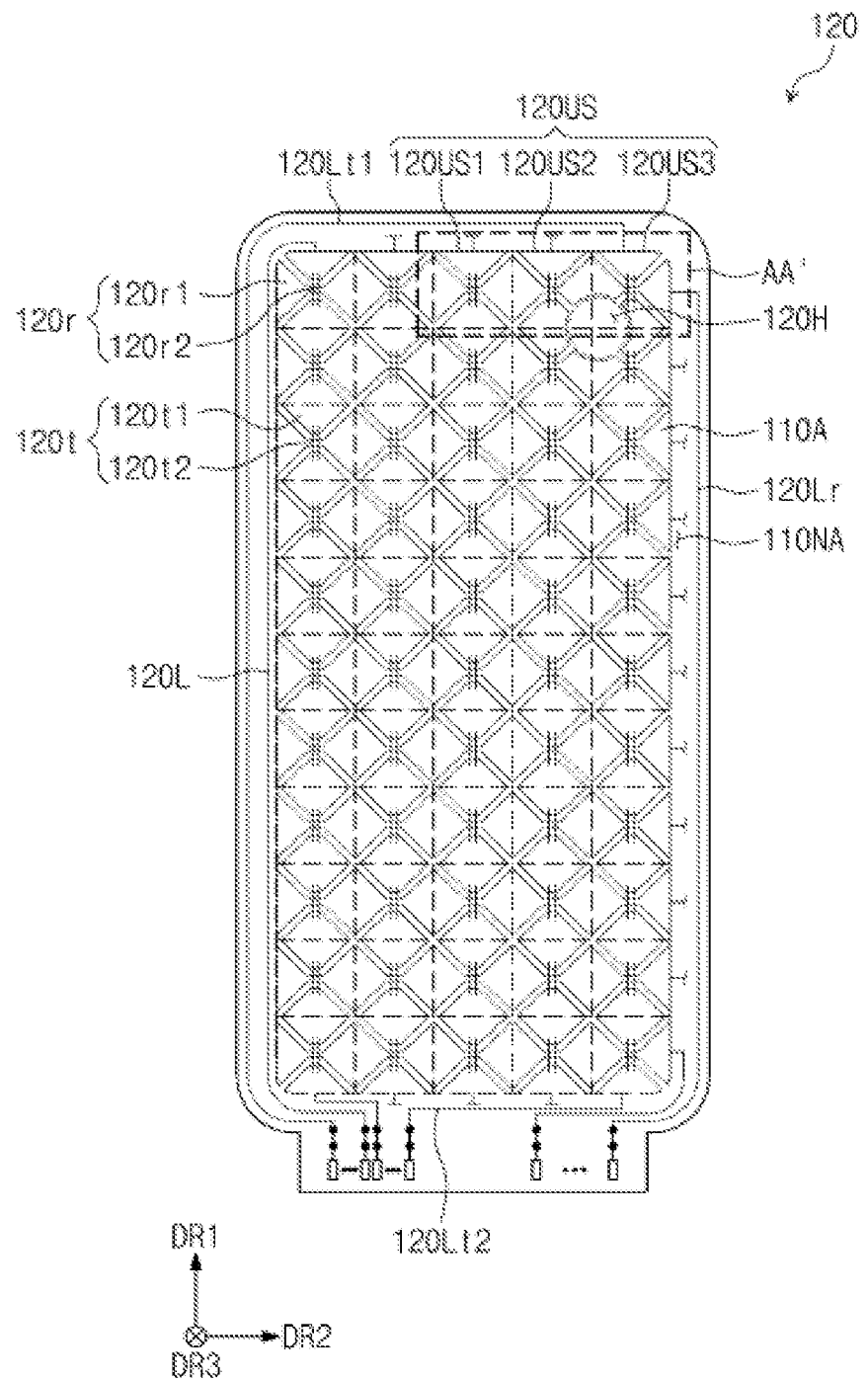
FIG. 6 is a plan view of the sensor layer according to an embodiment of the inventive concepts.

FIG. 6 is a plan view of the sensor layer 120 according to an embodiment of the inventive concepts.

Referring to FIG. 6, the sensor layer 120 includes a plurality of transmitting electrodes 120t (hereinafter, referred to as transmitting electrodes), a plurality of receiving electrodes 120r (hereinafter, referred to as receiving electrodes), and a plurality of sensing lines 120L, hereinafter, referred to as sensing lines).

Each of the transmitting electrodes 120t may extend along the first direction DR1. The transmitting electrodes 120t may be arranged in the second direction DR2. Each of the transmitting electrodes 120t may include sensing patterns 120t1 and bridge patterns 120t2. The two sensing patterns 120t1 adjacent to each other may be electrically connected to each other by the two bridge patterns 120t2, but embodiments of the inventive concepts are not particularly limited thereto.

Each of the receiving electrodes 120r may extend along the second direction DR2. The receiving electrodes 120r may be arranged in the first direction DR1. Each of the receiving electrodes 120r may include first portions 120r1 that are insulated from and cross the bridge patterns 120t2 and second portions 120r2 extending from the first portions 120r1. The first portions 120r1 and the second portions 120r2 may be integrated with each other and disposed on the same layer. The first portions 120r1 may be referred to as connection portions, bridge patterns, or bridge portions, and the second portions 120r2 may be referred to as sensing portions or sensing patterns.

The sensor layer 120 may acquire information on an external input through a change in mutual capacitance between the transmitting electrodes 120t and the receiving electrodes 120r. In an embodiment of the inventive concepts, the transmitting electrodes 120t may be changed to the receiving electrodes, and the receiving electrodes 120r may be changed to the transmitting electrodes.

A plurality of sensor units 120US (hereinafter, referred to as sensor units) may be defined in the sensor layer 120. The sensor units 120US may be defined as a unit including one area on which the bridge patterns 120t2 and the first portion 120r1 cross each other. Each of the sensor units 120US may include a portion of one receiving electrode 120r and a portion of one transmitting electrode 120t.

A hole 120H may be defined in the sensor layer 120. The hole 120H may be provided in an area overlapping the hole 110H of the display layer 110 (see FIG. 5). The hole 120H may be surrounded by the display area 110A. For convenience of description, the display area 110A and the non-display area 110NA of the display layer 110 (see FIG. 5) are illustrated together in FIG. 6. The hole 120H may also be referred to as a transmission area. The sensor units 120US may include a first sensor unit 120US1, a second sensor unit 120US2, and a third sensor unit 120US3. The first sensor unit 120US1 may be spaced apart from the hole 120H. Each of the second sensor unit 120US2 and the third sensor unit 120US3 may have a shape of which a portion is removed by the hole 120H. Each of the second sensor unit 120US2 and the third sensor unit 120US3 may be partially expanded toward an area overlapping the non-display area 110NA so as to compensate sensing sensitivity by a reduced area within the display area 110A. A detailed description with respect to this structure will be described later.

Each of the transmitting electrodes 120t and the receiving electrodes 120r may be electrically connected to at least one of the sensing lines 120L. For example, one transmitting electrode 120t may be connected to two sensing lines 120Lt1 and 120Lt2, which may be referred to as a double routing structure. One sensing line 120Lt1 may be electrically connected to one end of the transmitting electrode 120t, and another sensing line 120Lt2 may be electrically connected to the other end of the transmitting electrode 120t. One sensing line 120Lr may be electrically connected to one receiving electrode 120r, which may be referred to as a single routing structure.

One transmitting electrode 120t may receive a signal from the two sensing lines 120Lt1 and 120Lt2. In this case, since signals are provided to both ends of the transmitting electrode 120t having a relatively long length, the sensing sensitivity of the sensor layer 120 may be improved. Also, even though cracks or disconnection occurs in one of the two sensing lines 120Lt1 and 120Lt2, since the transmitting electrode 120t may receive a signal through other sensing lines, reliability may be improved.

However, the connection relationship between the sensing lines 120L with respect to the transmitting electrodes 120t and the receiving electrodes 120r is not limited to the illustrated example. For example, the transmitting electrodes 120t and the receiving electrodes 120r may be respectively connected to the sensing lines 120L in the double routing structure, the transmitting electrodes 120t and the receiving electrodes 120r may be respectively connected to the sensing lines 120L in the single routing structure, the transmitting electrodes 120t may be respectively connected to the sensing lines 120L in the single routing structure, or the receiving electrodes 120r may be respectively connected to the sensing lines 120L in the double routing structure.

Figure 7:
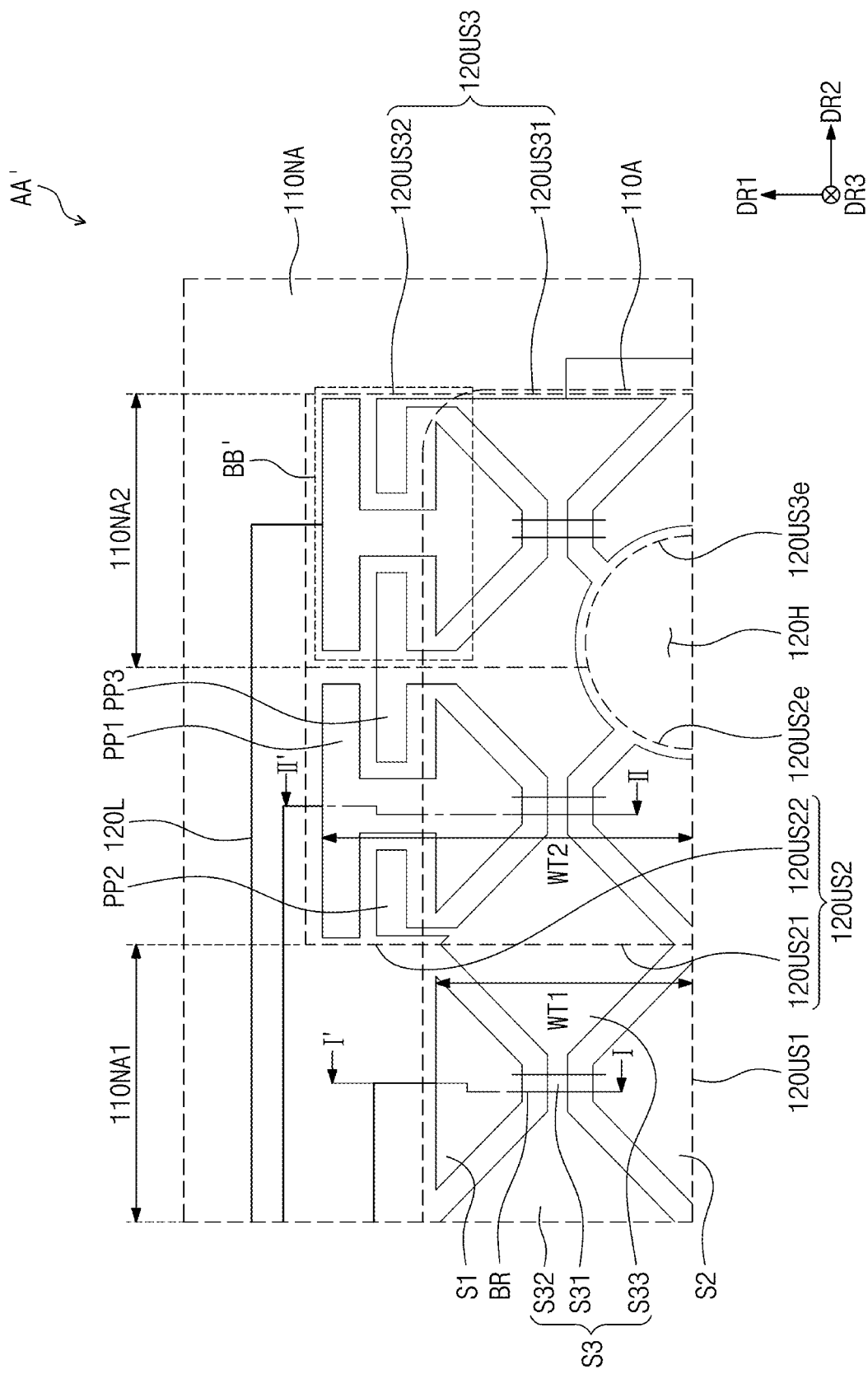
FIG. 7 is an enlarged plan view of an area AA' of FIG. 6 according to an embodiment of the inventive concepts.

FIG. 7 is an enlarged plan view of the area AA' of FIG. 6 according to an embodiment of the inventive concepts.

Referring to FIG. 7, a first sensor unit 120US1, a second sensor unit 120US2, and a third sensor unit 120US3 are illustrated. The second sensor unit 120US2 and the third sensor unit 120US3 may be disposed adjacent to the hole 120H. The second sensor unit 120US2 and the third sensor unit 120US3 may have edges 120US2e and 120US3e extending along the shape of the hole 120H.

The first sensor unit 120US1 may be spaced apart from the hole 120H with at least one sensor unit therebetween. For example, in FIG. 7, the first sensor unit 120US1 may be spaced apart from the hole 120H with the second sensor unit 120US2 therebetween. The first sensor unit 120US1, the second sensor unit 120US2, and the third sensor unit 120US3 may be sequentially arranged along the second direction DR2.

The first sensor unit 120US1 may overlap the display area 110A. A portion of each of the second sensor unit 120US2 and the third sensor unit 120US3 may overlap the display area 110A, and the other portion of each of the second sensor unit 120US2 and the third sensor unit 120US3 may overlap the non-display area 110NA.

The second sensor unit 120US2 may include a first portion 120US21 and a second portion 120US22. The second portion 120US22 may be a portion expanded from the first portion 120US21. The third sensor unit 120US3 may include a third portion 120US31 and a fourth portion 120US32. The fourth portion 120US32 may be a portion expanded from the third portion 120US31.

A surface area and shape of the first portion 120US21 of the second sensor unit 120US2 may be substantially the same surface area and shape as a surface area and shape from which a portion of the first sensor unit 120US1 is removed. Also, a surface area and shape of the third portion 120US31 of the third sensor unit 120US3 may be substantially the same as a surface area and shape from which a portion of the first sensor unit 120US1 is removed. That is, the first portion 120US21 of the second sensor unit 120US2 may be substantially the same as a shape of a portion of the first sensor unit 120US1. The third portion 120US31 of the third sensor unit 120US3 may be substantially the same as a shape of a portion of the first sensor unit 120US1.

Since each of the second sensor unit 120US2 and the third sensor unit 120US3 is provided adjacent to the hole 120H, each of the surface area of the first portion 120US21 of the second sensor unit 120US2 and the surface of the third portion 120US31 of the third sensor unit 120US3 may be less than that of the first sensor unit 120US1. When the surface area of the sensor unit is reduced, the sensing sensitivity of the sensor unit may decrease. According to an embodiment of the inventive concepts, since each of the second sensor unit 120US2 and the third sensor unit 120US3 is provided adjacent to the hole 120H, each of the second sensor unit 120US2 and the third sensor unit 120US3 may be expanded up to an area overlapping the non-display area 110NA so as to compensate the reduced surface area. That is, the second sensor unit 120US2 and the third sensor unit 120US3 may further include a second portion 120US22 and a fourth portion 120US32, which overlap the non-display area 110NA, respectively. Thus, the sensing sensitivity of the sensor layer 120 may be uniform, and the sensor layer 120 having the improved sensing sensitivity may be provided.

As the second sensor unit 120US2 is further expanded to the non-display area 110NA, a width WT2 of the second sensor unit 120US2 in the first direction DR1 may be greater than a width WT1 of the first sensor unit 120US1 in the first direction DR1. Each of the widths WT1 and WT2 may be defined as a maximum width in the first direction DR1.

A first area 110NA1 spaced apart from the hole 120H and a second area 110NA2 closer to the hole 120H than the first area 110NA1 may be defined on the non-display area 100NA. The first area 110NA1 may be adjacent to the first sensor unit 120US1 in the first direction DR1, and the second area 110NA2 may be an area overlapping the fourth portion 120US32 of the third sensor unit 120US3. The number of sensing lines 120L disposed on the second area 110NA2 may be less than the number of sensing lines 120L disposed on the first area 110NA1. Thus, a surface area within the non-display area 110NA, on which the second sensor unit 120US2 and the third sensor unit 120US3 will be expanded, may be further secured.

Each of the first sensor unit 120US1, the first portion 120US21 of the second sensor unit 120US2, and the third portion 120US31 of the third sensor unit 120US3 may include a bridge pattern BR, a first sensing pattern S1, a second sensing pattern S2, and a third sensing pattern S3. The third sensing pattern S3 may include a first portion S31, a second portion S32, and a third portion S33.

The bridge pattern BR, the first sensing pattern S1, and the second sensing pattern S2 may be a portion of one transmitting electrode 120t (see FIG. 6), and the third sensing pattern S3 may be a portion of one receiving electrode 120r (see FIG. 6).

The bridge pattern BR may be a constituent corresponding to the bridge pattern 120t2 (see FIG. 6), and the first sensing pattern S1 and the second sensing pattern S2 may be provided in the sensing patterns 120t1 (see FIG. 6). The first portion S31 may have a constituent corresponding to the first portion 120r1 (see FIG. 6), and the second portion S32 and the third portion S33 may be provided in the second portions 120r2.

Each of the first sensing pattern S1 and the second sensing pattern S2 may be spaced apart from each other with the first portion S31 therebetween. Each of the first sensing pattern S1 and the second sensing pattern S2 may contact the bridge pattern BR. Thus, the first sensing pattern S1 may be electrically connected to the second sensing pattern S2 through the bridge pattern BR.

The third sensing pattern S3 may be spaced apart from the first sensing pattern S1 and the second sensing pattern S2. The first portion S31 may overlap the bridge pattern BR. The second portion S32 may extend from the first portion S31 to face the first sensing pattern S1 and the second sensing pattern S2. The third portion S33 may extend from the first portion S31 to face the first sensing pattern S1 and the second sensing pattern S2.

Each of the second portion 120US22 of the second sensor unit 120US2 and the fourth portion 120US32 of the third sensor unit 120US3 may include a first protrusion PP1, a second protrusion PP2, and a third protrusion PP3. Hereinafter, the second portion 120US22 of the second sensor unit 120US2 will be described as an example.

The first protrusion PP1 may extend from the first sensor pattern S1 of the second sensor unit 120US2 toward an area overlapping the non-display area 110NA. The first protrusion PP1 may include at least two branch portions, and the two branch portions may be spaced apart from the first sensor pattern S1. The two branch portions may extend along the second direction DR2.

The second protrusion PP2 may extend from the second portion S32 of the second sensor unit 120US2 toward an area overlapping the non-display area 110NA. The second protrusion PP2 may face the first protrusion PP1.

The third protrusion PP3 may extend from the third portion S33 of the third sensor unit 120US3 toward an area overlapping the non-display area 110NA. The third protrusion PP3 may face the first protrusion PP1.

The second protrusion PP2 and the third protrusion PP3 may be spaced apart from each other with the first protrusion PP1 therebetween. The second protrusion PP2 may be disposed between the first protrusion PP1 and the first sensing pattern S1 of the second sensor unit 120US2, and the third protrusion PP3 may be disposed between the first protrusion PP1 and the first sensing pattern S1 of the second sensor unit 120US2.

The third protrusion PP3 of the second sensor unit 120US2 may be integrated with the second protrusion PP2 of the third sensor unit 120US3.

According to an embodiment of the inventive concepts, a boundary at which a portion of the receiving electrode and a portion of the transmitting electrode are engaged with each other may increase in length by the shapes of the first to third protrusions PP1, PP2, and PP3, which are respectively disposed on the second portion 120US22 and the fourth portion 120US32. Thus, the sensing sensitivity of each of the second sensor unit 120US2 and the third sensor unit 120US3 may be easily improved to a level similar to that of the first sensor unit 120US1. The first sensor unit 120US1 may be referred to as a reference sensor unit.

According to an embodiment of the inventive concepts, since the first to third protrusions PP1, PP2, and PP3 overlap the non-display area 110NA, the shape of each of the first to third protrusions PP1, PP2, and PP3 may not need to be limited to a specific shape. Thus, since the shapes of the first to third protrusions PP1, PP2, and PP3 are variously deformed as long as the first to third protrusions PP1, PP2, and PP3 are capable of improving the sensing sensitivity, design freedom may be improved.

Each of the bridge pattern BR, the first sensing pattern S1, the second sensing pattern S2, the third sensing pattern S3, the first protrusion PP1, the second protrusion PP2, and the third protrusion PP3 may have a single-layered structure or have a multilayered structure stacked in the third direction DR3.

The conductive layer having the single-layered structure may include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), indium zinc tin oxide (IZTO), or the like. In addition, the transparent conductive layer may include conductive polymers such as PEDOT, metal nanowires, graphene, and the like.

The conductive layer having the multilayered structure may include metal layers. The metal layers may have a three-layered structure of titanium/aluminum/titanium. The conductive layer having the multilayered structure may include at least one metal layer and at least one transparent conductive layer.

When each of the bridge pattern BR, the first sensing pattern S1, the second sensing pattern S2, the third sensing pattern S3, the first protrusion PP1, the second protrusion PP2, and the third protrusion PP3 includes an opaque material, each of the bridge pattern BR, the first sensing pattern S1, the second sensing pattern S2, the third sensing pattern S3, the first protrusion PP1, the second protrusion PP2, and the third protrusion PP3 may have a mesh structure.

Figure 8:
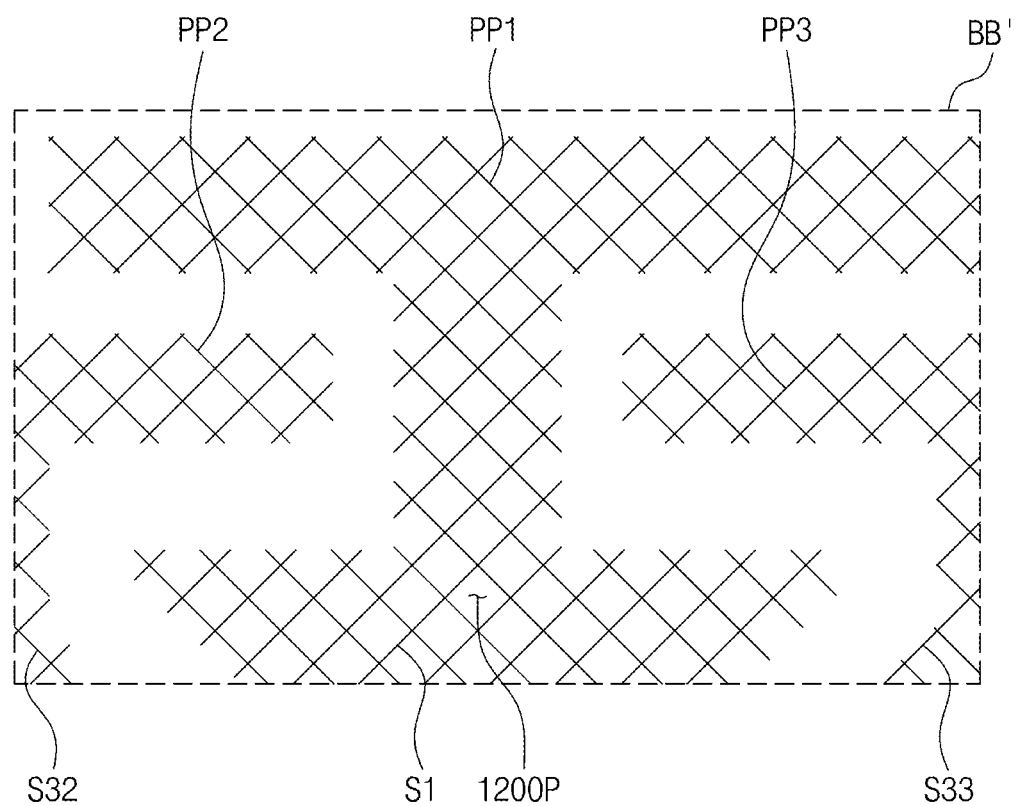
FIG. 8 is an enlarged plan view of an area BB' of FIG. 7 according to an embodiment of the inventive concepts.

FIG. 8 is an enlarged plan view of an area BB' of FIG. 7 according to an embodiment of the inventive concepts.

Referring to FIGS. 7 and 8, each of the first sensing pattern S1, the second sensing pattern S2, the third sensing pattern S3, the first protrusion PP1, the second protrusion PP2, and the third protrusion PP3 may have a mesh structure. An opening 120op defined by the mesh structure may overlap the emission area PXA illustrated in FIG. 4.

In FIG. 8, each of the first sensing pattern S1, the second sensing pattern S2, the third sensing pattern S3, the first protrusion PP1, the second protrusion PP2, and the third protrusion PP3 has the mesh structure, but is not limited thereto. For example, each of the first sensing pattern S1, the second sensing pattern S2, the third sensing pattern S3, the first protrusion PP1, the second protrusion PP2, and the third protrusion PP3 may have a conductive electrode structure. In this case, the conductive electrode may include transparent conductive oxide.

Figure 9A:
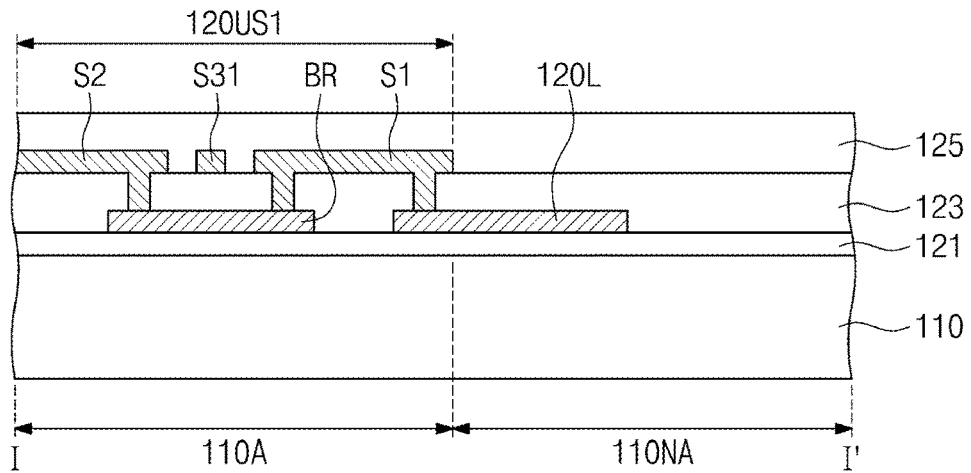
FIG. 9A is a cross-sectional view taken along line I-I' of FIG. 7.
Figure 9B:
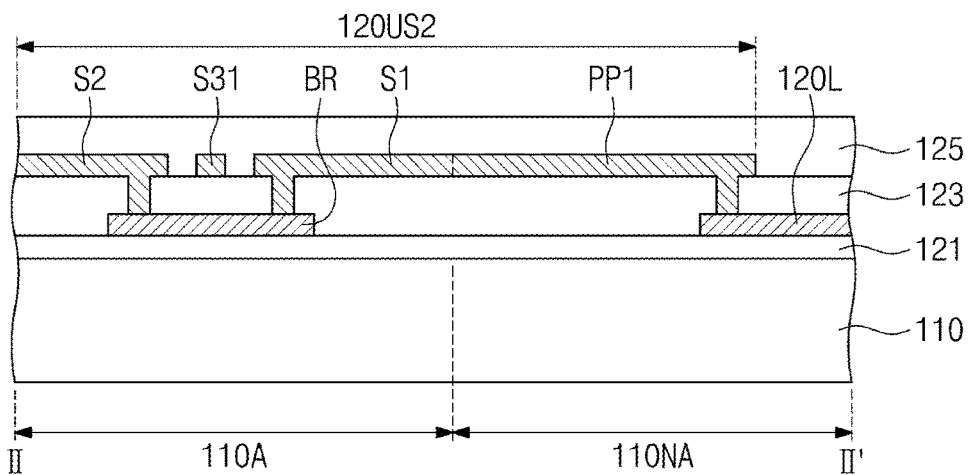
FIG. 9B is a cross-sectional view taken along line II-IF of FIG. 7.

FIG. 9A is a cross-sectional view taken along line I-I' of FIG. 7. FIG. 9B is a cross-sectional view taken along line II-IF of FIG. 7. FIG. 9A is a cross-sectional view illustrating a portion of the first sensor unit 120US1 (see FIG. 7), and FIG. 9B is a cross-sectional view illustrating a portion of the second sensor unit 120US2 (see FIG. 7).

Referring to FIGS. 7, 9A, and 9B, the display area 110A and the non-display area 110NA are defined on the display layer 110. The first sensor unit 120US1 may overlap the display area 110A and may not overlap the non-display area 110NA. The second sensor unit 120US2 may overlap both the display area 110A and the non-display area 110NA.

The sensing line 120L may be disposed between the base layer 121 and the sensing insulating layer 123. The sensing line 120L may be provided in the first conductive layer 122 (see FIG. 4). In FIGS. 9A and 9B, a configuration in which the sensing line 120L is provided in the first conductive layer 122 (see FIG. 4) has been described as an example, but embodiments of the inventive concepts are not limited thereto. For example, in an embodiment of the inventive concepts, the sensing line 120L may be provided in the second conductive layer 124 (see FIG. 4). Also, in an embodiment of the inventive concepts, the sensing line 120L may be provided in a first sensing line pattern provided in the first conductive layer 122 (see FIG. 4) and a second sensing line pattern provided in the second conductive layer 124 (see FIG. 4). The first sensing line pattern and the second sensing line pattern may be electrically connected to each other.

Referring to FIG. 9A, the sensing line 120L may contact the first sensing pattern S1. Referring to FIG. 9B, the sensing line 120L may contact the first protrusion PP1. The sensing line 120L may be electrically connected to the first sensing pattern S1 of the second sensor unit 120US2 through the protrusion PP1. However, embodiments of the inventive concepts are not limited thereto. For example, in FIG. 9B, the sensing line 120L may extend up to the vicinity of the boundary between the display area 110A and the non-display area 110NA.

Figure 10:
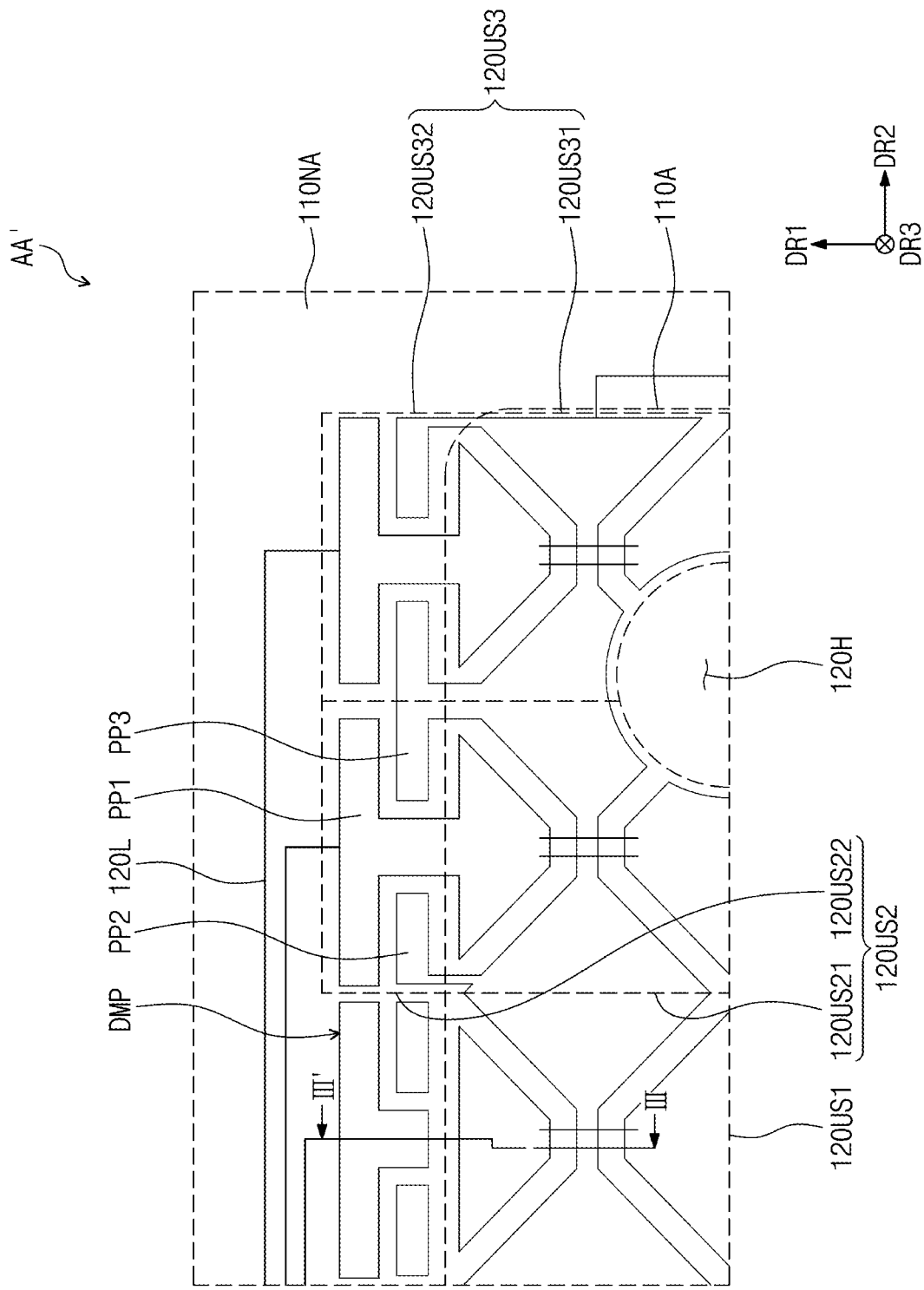
FIG. 10 is an enlarged plan view of the area AA' of FIG. 6 according to an embodiment of the inventive concepts.

FIG. 10 is an enlarged plan view of the area AA' of FIG. 6 according to an embodiment of the inventive concepts.

Referring to FIGS. 6 and 10, the sensor layer 120 may further include a dummy pattern DMP disposed on the non-display area 110NA. The dummy pattern DMP may be disposed on the non-display area 110NA facing the first sensor unit 120US1. The dummy pattern DMP may have a shape similar to that of each of the first to third protrusions PP1, PP2, and PP3 disposed on the second portion 120US22 of the second sensor unit 120US2.

The dummy pattern DMP may be disposed on the non-display area 110NA facing the first sensor unit 120US1 corresponding to the positions of the second portion 120US22 of the second sensor unit 120US2 and the fourth portion 120US32 of the third sensor unit 120US3. Thus, a difference in reflectance between the non-display area 110NA facing the first sensor unit 120US1 and the non-display area 110NA to which each of the second sensor unit 120US2 and the third sensor unit 120US3 extends may be reduced. As a result, probability that a portion of the second sensor unit 120US2 and a portion of the third sensor unit 120US3, which are disposed on the non-display area 110NA, are visually recognized from the outside may be reduced, or the portions may not be visually recognized from the outside.

Figure 11:
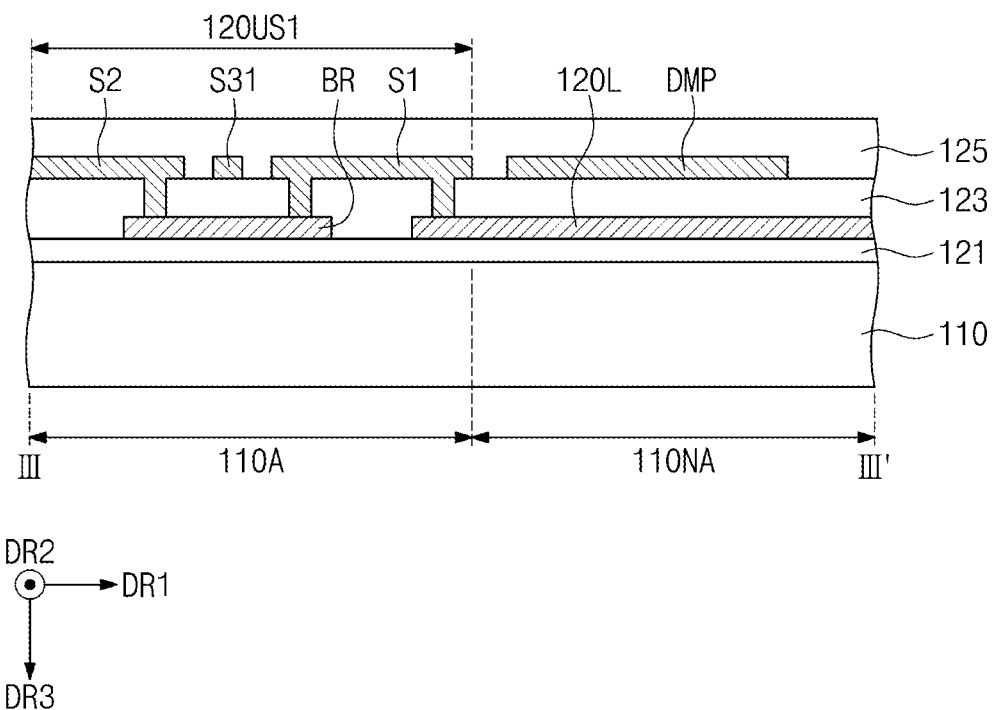
FIG. 11 is a cross-sectional view taken along line of FIG. 10.

FIG. 11 is a cross-sectional view taken along line of FIG. 10.

Referring to FIGS. 10 and 11, the display area 110A and the non-display area 110NA are defined on the display layer 110. The first sensor unit 120US1 may overlap the display area 110A and may not overlap the non-display area 110NA. The dummy pattern DMP may be spaced apart from the first sensor unit 120US1 and may overlap the non-display area 110NA.

Figure 12:
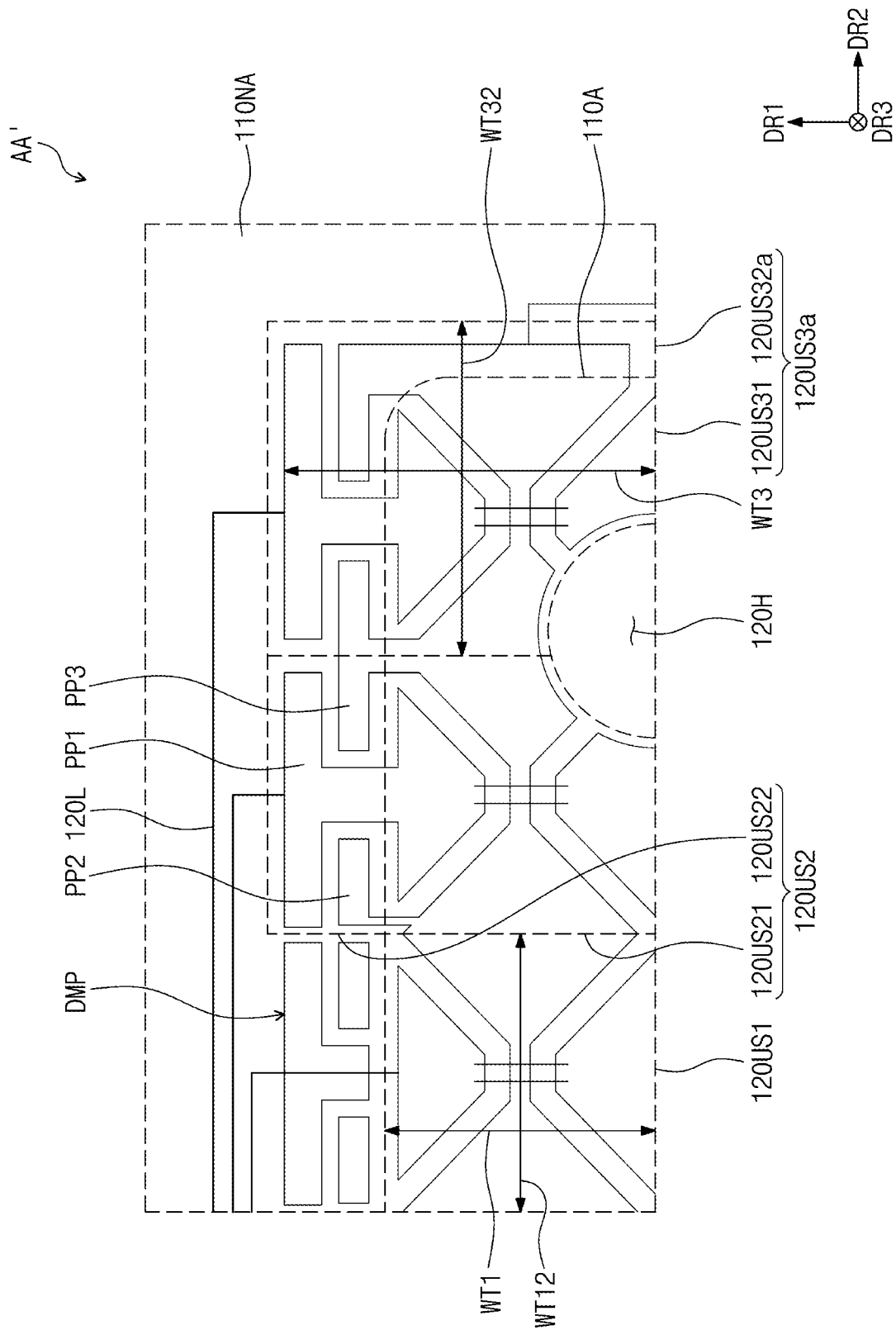
FIG. 12 is an enlarged plan view of the area AA' of FIG. 6 according to an embodiment of the inventive concepts.

FIG. 12 is an enlarged plan view of the area AA' of FIG. 6 according to an embodiment of the inventive concepts.

Referring to FIGS. 6 and 12, a third sensor unit 120US3$a$ may include a third portion 120US31 and a fourth portion 120US32$a$. The third portion 120US31 may be an area overlapping the display area 110A, and the fourth portion 120US32$a$ may be an area overlapping the non-display area 110NA. When viewed on the plane, the third portion 120US31 may be adjacent to the non-display area 110NA in both the first direction DR1 and the second direction DR2. Thus, the fourth portion 120US32$a$ may extend from the third portion 120US31 in both the first direction DR1 and the second direction DR2.

A width WT3 of the third sensor unit 120US3$a$ in the first direction DR1 may be greater than the width WT1 of the first sensor unit 120US1 in the first direction DR1, and a width WT32 of the third sensor unit 120US3$a$ in the second direction DR2 may be greater than the width WT12 of the first sensor unit 120US1 in the second direction DR2. Each of the widths WT1, WT12, WT3, and WT32 may mean a maximum width within the sensor unit.

The hole 120H may be defined to be further leaned toward the third sensor unit 120US3$a$ with respect to the boundary between the second sensor unit 120US2 and the third sensor unit 120US3$a$. Thus, a surface area of the first portion 120US21 of the second sensor unit 120US2 may be larger than that of the third portion 120US31 of the third sensor unit 120US3$a$.

The sensing sensitivity of the third portion 120US31 of the third sensor unit 120US3$a$ may be less than that of the first portion 120US21 of the second sensor unit 120US2. Thus, to compensate the difference in sensing sensitivity, a surface area of the fourth portion 120US32$a$ of the third sensor unit 120US3$a$ may be designed to be greater than that of the second portion 120US22 of the second sensor unit 120US2. For example, the third sensor unit 120US3$a$ may have a shape that is more expanded in the second direction DR2 than the second sensor unit 120US2.

According to an embodiment of the inventive concepts, the compensated surface area may vary according to the removed surface area of the sensor unit when compared to the reference sensor unit. That is, the sensing layer 120 having the more uniform sensing sensitivity may be provided by allowing the compensated surface area to vary according to a degree of sensitivity reduction.

Figure 13:
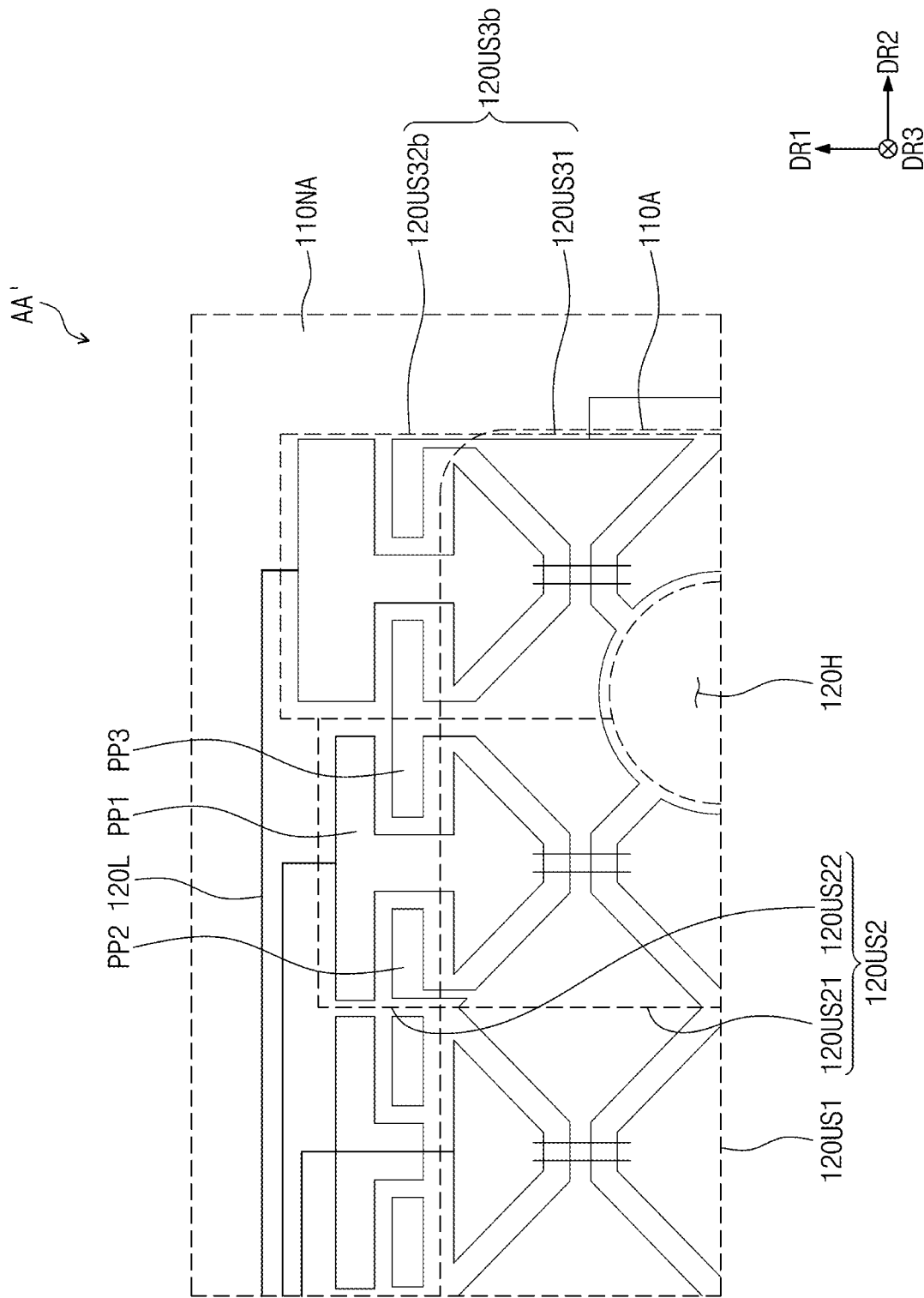
FIG. 13 is an enlarged plan view of the area AA' of FIG. 6 according to an embodiment of the inventive concepts.

FIG. 13 is an enlarged plan view of the area AA' of FIG. 6 according to an embodiment of the inventive concepts.

Referring to FIGS. 6 and 13, a third sensor unit 120US3$b$ may include a third portion 120US31 and a fourth portion 120US32$b$. The third portion 120US31 may be an area overlapping the display area 110A, and the fourth portion 120US32$b$ may be a portion overlapping the non-display area 110NA.

The hole 120H may be defined to be further leaned toward the third sensor unit 120US3$b$ with respect to the boundary between the second sensor unit 120US2 and the third sensor unit 120US3$b$. Thus, the surface area of the first portion 120US21 of the second sensor unit 120US2 may be greater than that of the third portion 120US31 of the third sensor unit 120US3$b$. To compensate the difference in sensing sensitivity, a surface area of the fourth portion 120US32$b$ of the third sensor unit 120US3$b$ may be designed to be greater than that of the second portion 120US22 of the second sensor unit 120US2. For example, the third sensor unit 120US3$b$ may have a shape that is more expanded in the first direction DR1 than the second sensor unit 120US2.

Figure 14:
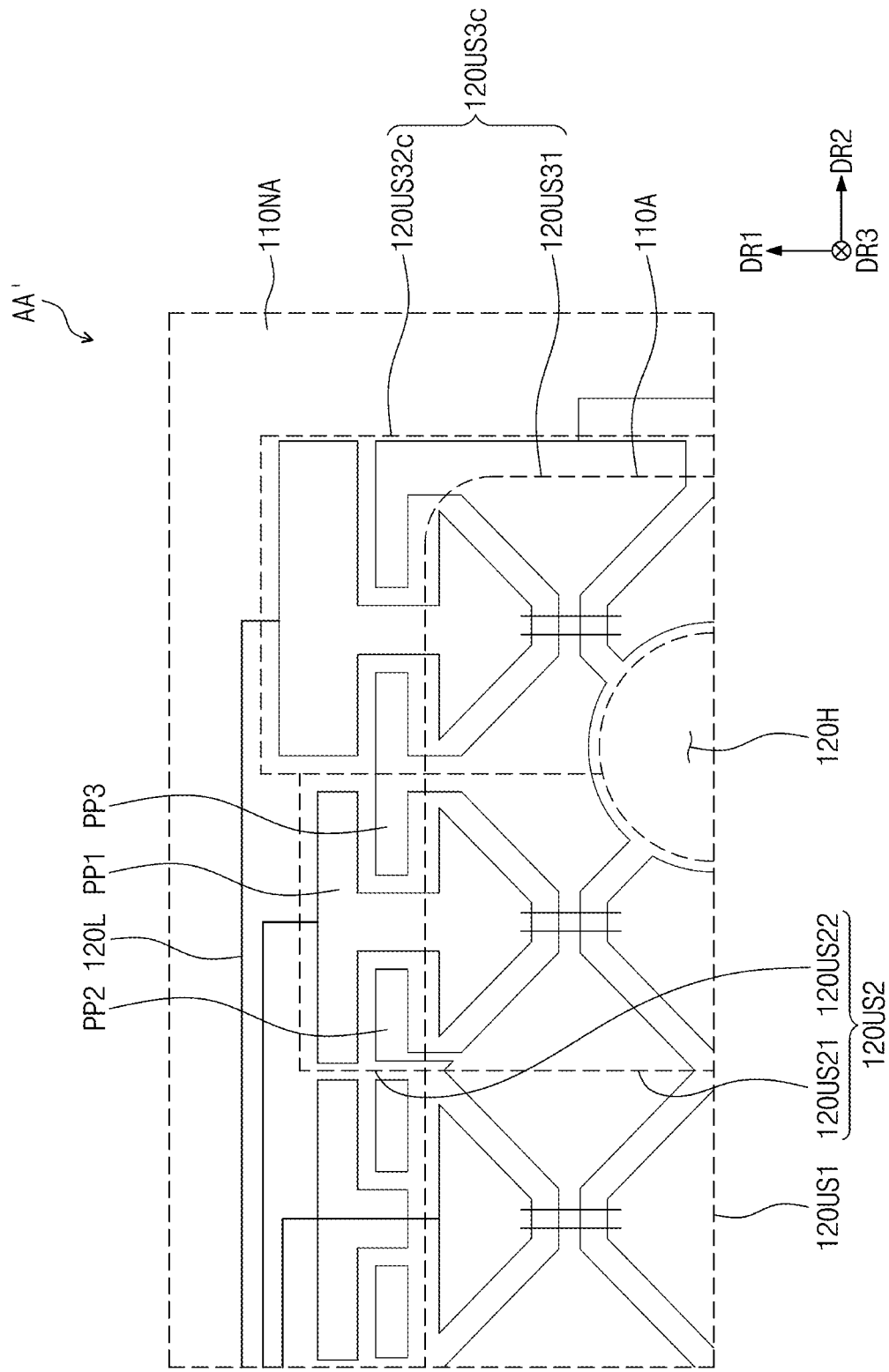
FIG. 14 is an enlarged plan view of the area AA' of FIG. 6 according to an embodiment of the inventive concepts.

FIG. 14 is an enlarged plan view of the area AA' of FIG. 6 according to an embodiment of the inventive concepts.

Referring to FIGS. 6 and 14, a third sensor unit 120US3c may include a third portion 120US31 and a fourth portion 120US32c. The third portion 120US31 may be an area overlapping the display area 110A, and the fourth portion 120US32c may be an area overlapping the non-display area 110NA. When viewed on the plane, the third portion 120US31 may be adjacent to the non-display area 110NA in both the first direction DR1 and the second direction DR2. Thus, the fourth portion 120US32c may extend from the third portion 120US31 in both the first direction DR1 and the second direction DR2.

The hole 120H may be defined to be further leaned toward the third sensor unit 120US3c with respect to the boundary between the second sensor unit 120US2 and the third sensor unit 120US3c. To compensate the difference in sensing sensitivity, a surface area of the fourth portion 120US32c of the third sensor unit 120US3c may be designed to be greater than that of the second portion 120US22 of the second sensor unit 120US2. For example, the third sensor unit 120US3c may have a shape that is further expanded in the first direction DR1 and the second direction DR2 than the second sensor unit 120US2.

Figure 15:
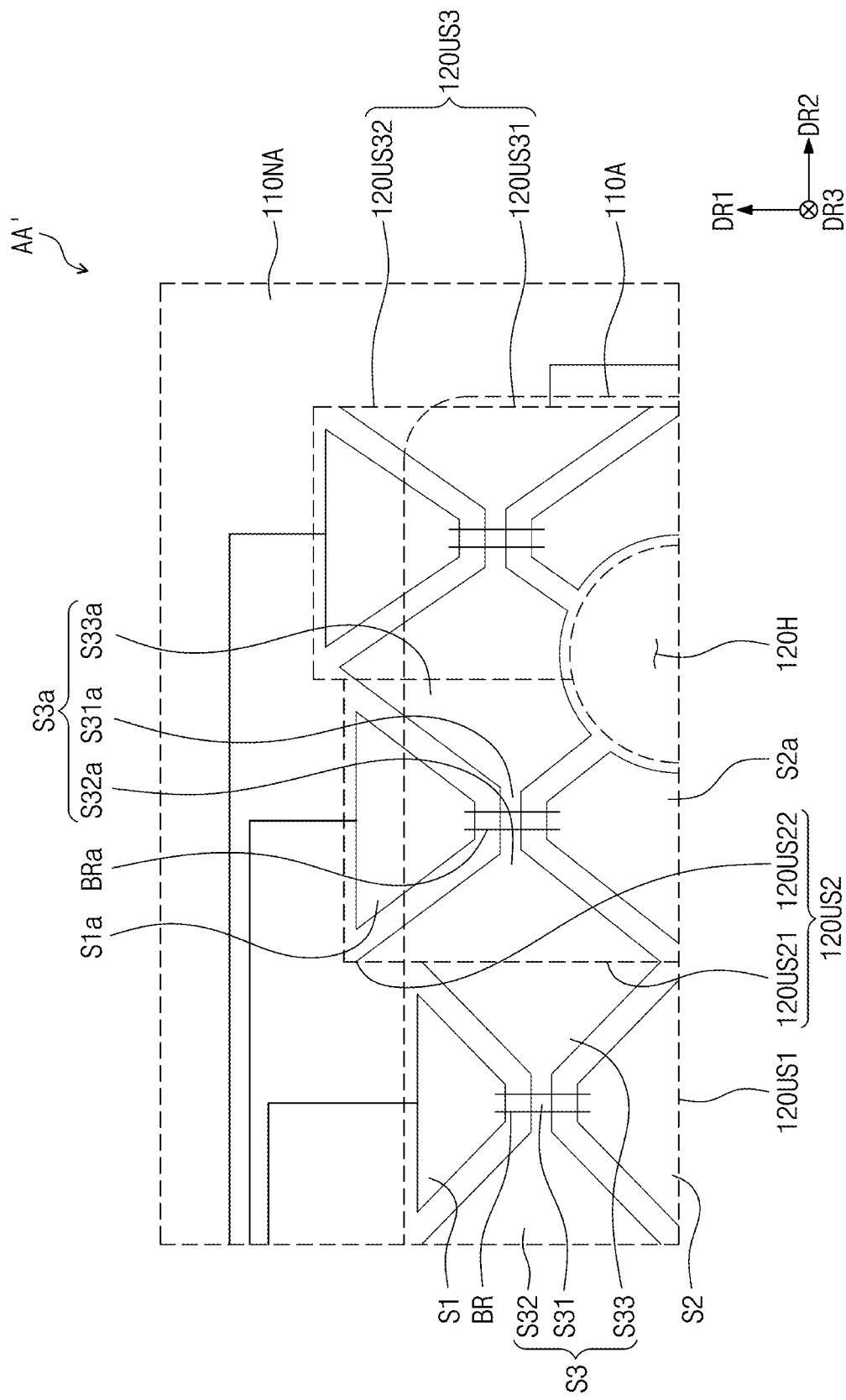
FIG. 15 is an enlarged plan view of the area AA' of FIG. 6 according to an embodiment of the inventive concepts.

FIG. 15 is an enlarged plan view of the area AA' of FIG. 6 according to an embodiment of the inventive concepts.

Referring to FIGS. 6 and 15, each of the second sensor unit 120US2 and the third sensor unit 120US3 may include a bridge pattern BRa, a first sensing pattern S1a, a second sensing pattern S2a, and a third sensing pattern S3a. The third sensing pattern S3a may include a first portion S31a, a second portion S32a, and a third portion S33a.

A portion of the first sensing pattern S1a, a portion of the second portion S32a, and a portion of the third portion S33a of each of the second sensor unit 120US2 and the third sensor unit 120US3 may overlap the non-display area 110NA. For example, unlike the above-described embodiment, each pattern disposed on each of the second sensor unit 120US2 and the third sensor unit 120US3 may have a shape extending along the first direction DR1.

Figure 16:
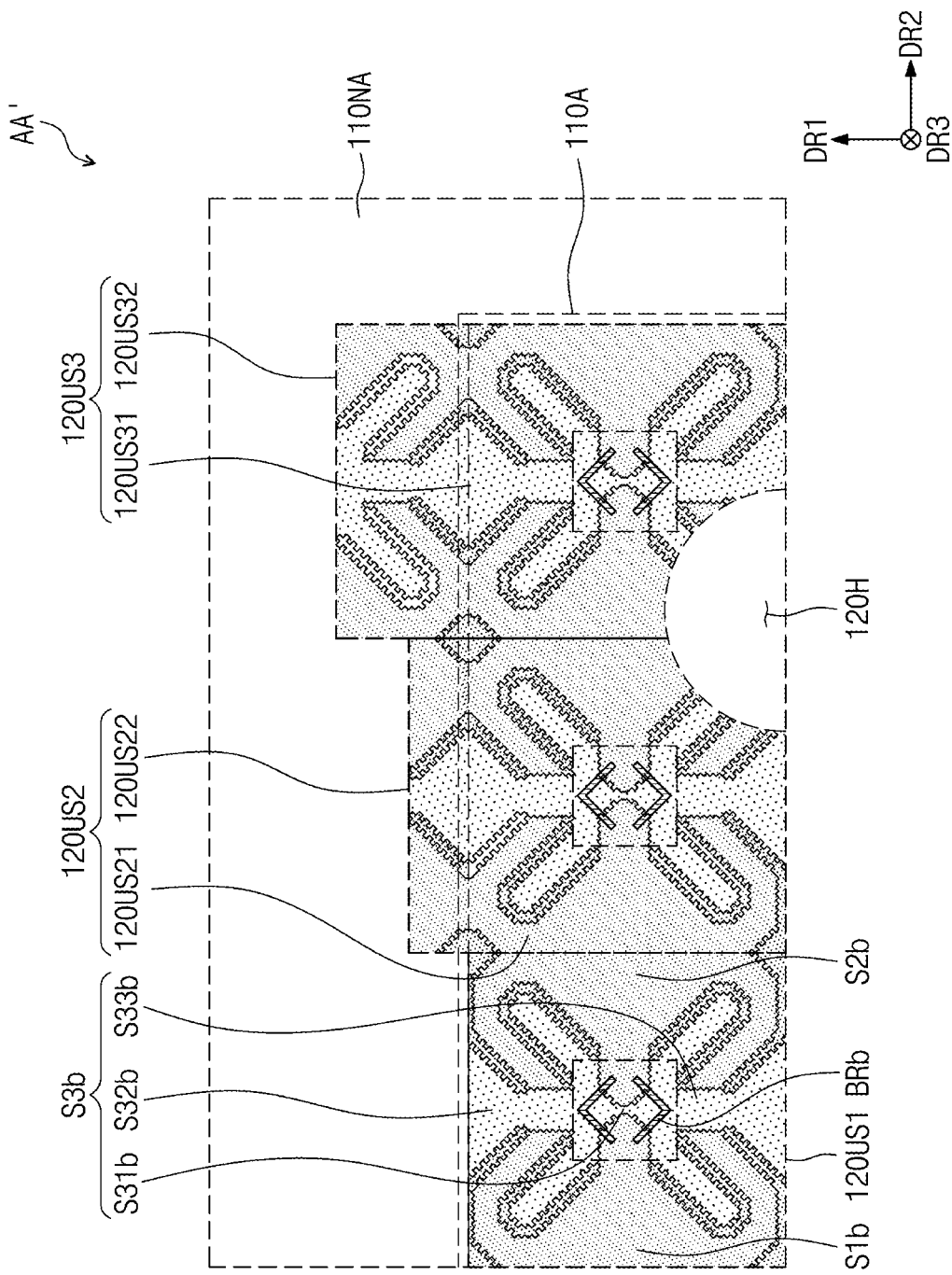
FIG. 16 is an enlarged plan view of the area AA' of FIG. 6 according to an embodiment of the inventive concepts.

FIG. 16 is an enlarged plan view of the area AA' of FIG. 6 according to an embodiment of the inventive concepts.

Referring to FIG. 16, unlike the above-described embodiments, the patterns constituting each of the first sensor unit 120US1, the second sensor unit 120US2, and the third sensor unit 120US3 may have different shapes. For example, the first sensor unit 120US1 may include a bridge pattern BRb, a first sensing pattern S1b, a second sensing pattern S2b, and a third sensing pattern S3b. The third sensing pattern S3b may include a first portion S31b, a second portion S32b, and a third portion S33b.

Each of the second portion S32b and the third portion S33b may include branch portions extending along directions that are away from the first portion S31b. For example, each of the second portion S32b and the third portion S33b may include two branch portions extending along a direction crossing the first direction DR1 and the second direction DR2.

The first sensing pattern S1b may have a shape surrounding a portion of the second portion S32b and a portion of the third portion S33b, and the second sensing pattern S2b may have a shape surrounding a remaining portion of the second portion S32b and a remaining portion of the third portion S33b.

According to an embodiment of the inventive concepts, regardless of the shapes of the patterns constituting the sensor unit, when the surface area of the sensor unit is reduced rather than that of the reference sensor unit by overlapping the transmission area, for example, the hole 120H, the sensor unit may be expanded to the non-display area 110NA to improve the reduced sensing sensitivity.

Figure 17:
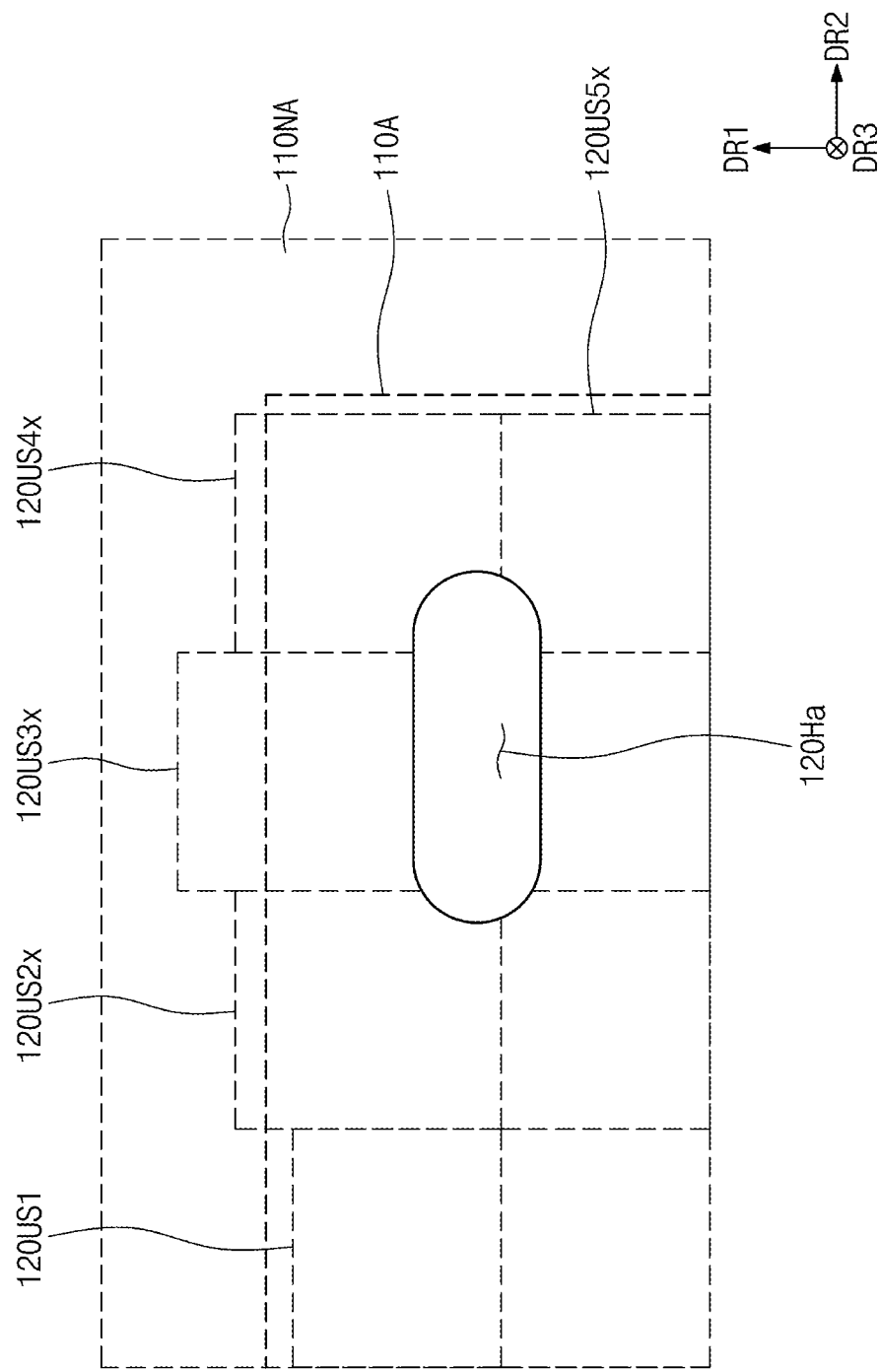
FIG. 17 is a plan view illustrating a portion of the sensor layer according to an embodiment of the inventive concepts.

FIG. 17 is a plan view illustrating a portion of the sensor layer according to an embodiment of the inventive concepts.

Referring to FIG. 17, a shape of a hole 120Ha provided in the display area 110A may be variously modified. For example, the hole 120Ha may be a wide hole including at least two straight lines.

Some of a plurality of sensor units 120US1, 120US2x, 120US3x, 120US4x, and 120US5x may overlap the hole 120Ha. For example, the sensor units 120US2x, 120US3x, 120US4x, 120US5x may overlap the hole 120Ha, and each of the sensor units 120US2x, 120US3x, 120US4x, and 120US5x may have a shape of which a portion is partially removed to correspond to the shape of the hole 120Ha.

At least a portion of the sensor units 120US2x, 120US3x, 120US4x, and 120US5x may have a shape expanded toward the non-display area 110NA. For example, the sensor units 120US2x, 120US3x, and 120US4x may be expanded in the first direction DR1. Among the sensor units 120US2x, 120US3x, and 120US4x, the sensor unit 120US3x in which the largest surface area is removed by the hole 120Ha may be expanded more than other sensor units 120US2x and 120US4x.

Unlike that illustrated in FIG. 17, the sensor unit 120US5x may be further extended in the second direction DR2. In this case, a portion of the sensor unit 120US5x may overlap the non-display area 110NA.

Figure 18:
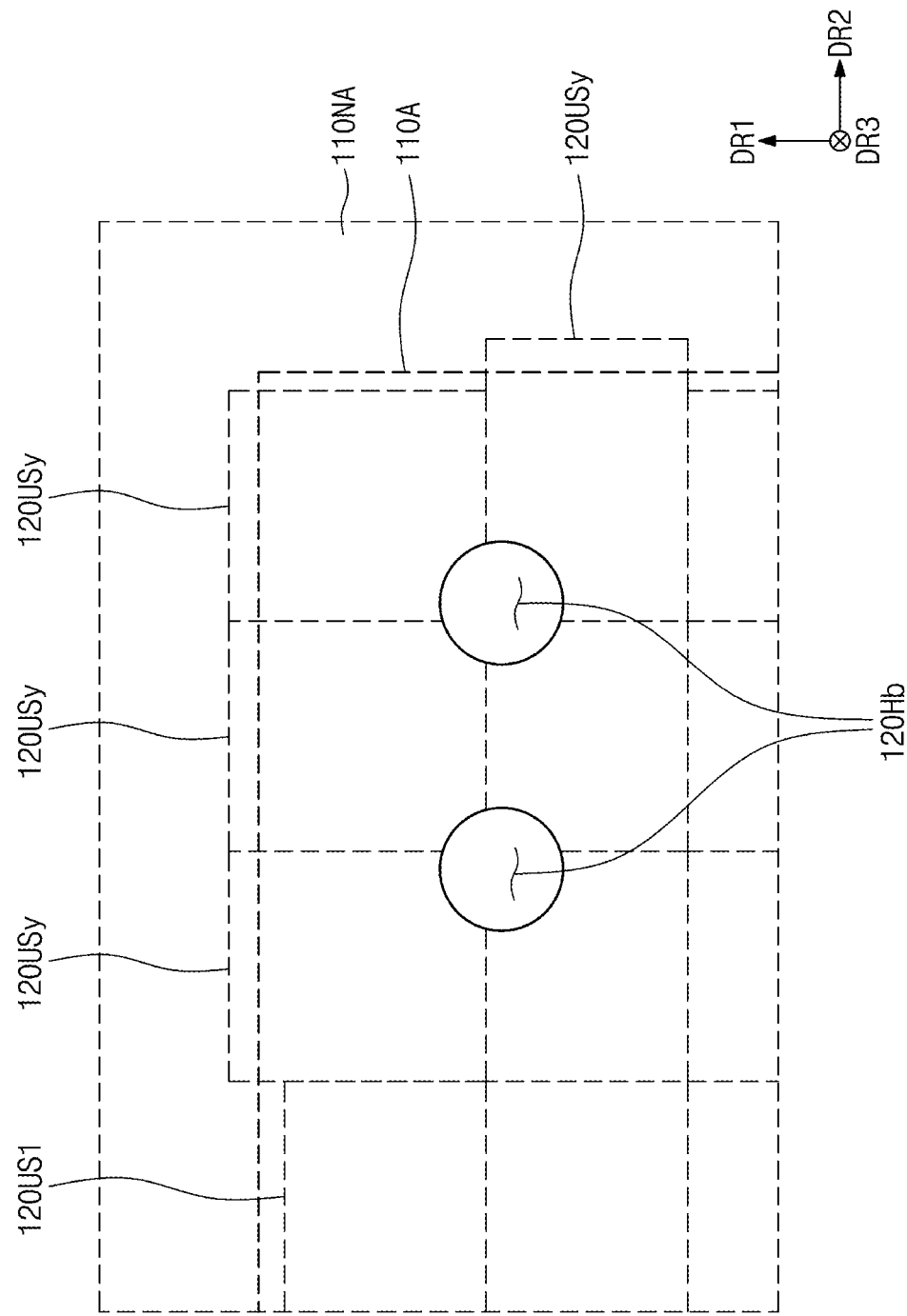
FIG. 18 is a plan view illustrating a portion of the sensor layer according to an embodiment of the inventive concepts.

FIG. 18 is a plan view illustrating a portion of the sensor layer according to an embodiment of the inventive concepts.

Referring to FIG. 18, holes 120Hb may be provided in the display area 110A. In FIG. 18, two holes 120Hb are illustrated as an example, but the number of holes 120Hb is not limited thereto. Each of sensor units 120USy overlapping the holes 120Hb may be expanded toward the non-display area 110NA. Thus, sensing sensitivity of the sensor units 120USy, which is reduced as the sensor units 120USy are adjacent to the holes 120Hb, may be compensated through the expansion to the non-display area 110NA.

Figure 19:
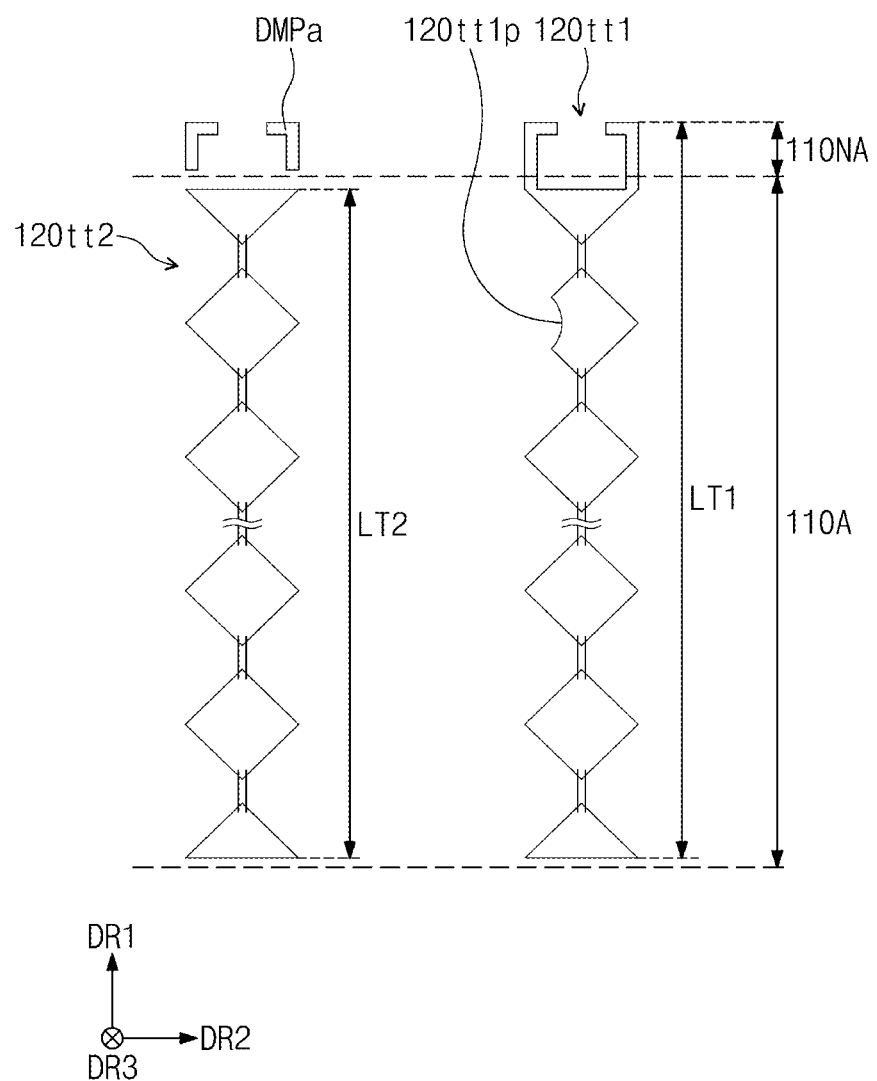
FIG. 19 is a plan view illustrating some of constituents of the sensor layer according to an embodiment of the inventive concepts.

FIG. 19 is a plan view illustrating some of constituents of the sensor layer according to an embodiment of the inventive concepts.

Referring to FIGS. 6 and 19, a first sensing electrode 120tt1 and a second sensing electrode 120tt2 among the plurality of transmitting electrodes 120t are illustrated. The first sensing electrode 120tt1 may be an electrode adjacent to the hole 120H. Thus, a portion 120tt1p of the first sensing electrode 120tt1 may have a shape that is removed to correspond to the shape of the hole 120H. The portion 120tt1p of the first sensing electrode 120tt1 is a portion 120tt1p of an edge of the first sensing electrode 120tt1. That is, a portion 120tt1p of the edge of the first sensing electrode 120tt1 may have a shape removed corresponding to the shape of the hole 120H.

The first sensing electrode 120tt1 may overlap the display area 110A and the non-display area 110NA. The portion overlapping the non-display area 110NA may be a portion extending from the display area 110A, for example, a portion extending to compensate the reduced sensing sensitivity as the portion 120tt1p of the first sensing electrode 120tt1 is removed.

The second sensing electrode 120tt2 may be an electrode spaced apart from the hole 120H. A length LT2 of the second sensing electrode 120tt2 may be less than a length LT1 of the first sensing electrode 120tt1. Each of the first sensing electrode 120*tt*1 and the second sensing electrode 120*tt*2 may extend in the first direction DR1, and the first sensing electrode 120*tt*1 and the second sensing electrode 120*tt*2 may be spaced apart from each other in the second direction DR2. The lengths LT1 and LT2 of the first and second sensing electrodes 120*tt*1 and 120*tt*2 may be lengths in a direction parallel to the first direction DR1.

The sensor layer 120 may further include a dummy pattern DMPa disposed to face the second sensing electrode 120*tt*2 and overlap the non-display area 110NA. The dummy pattern DMPa may have a shape similar to that of a portion of the first sensing electrode 120*tt*1 overlapping the non-display area 110NA.

Figure 20:
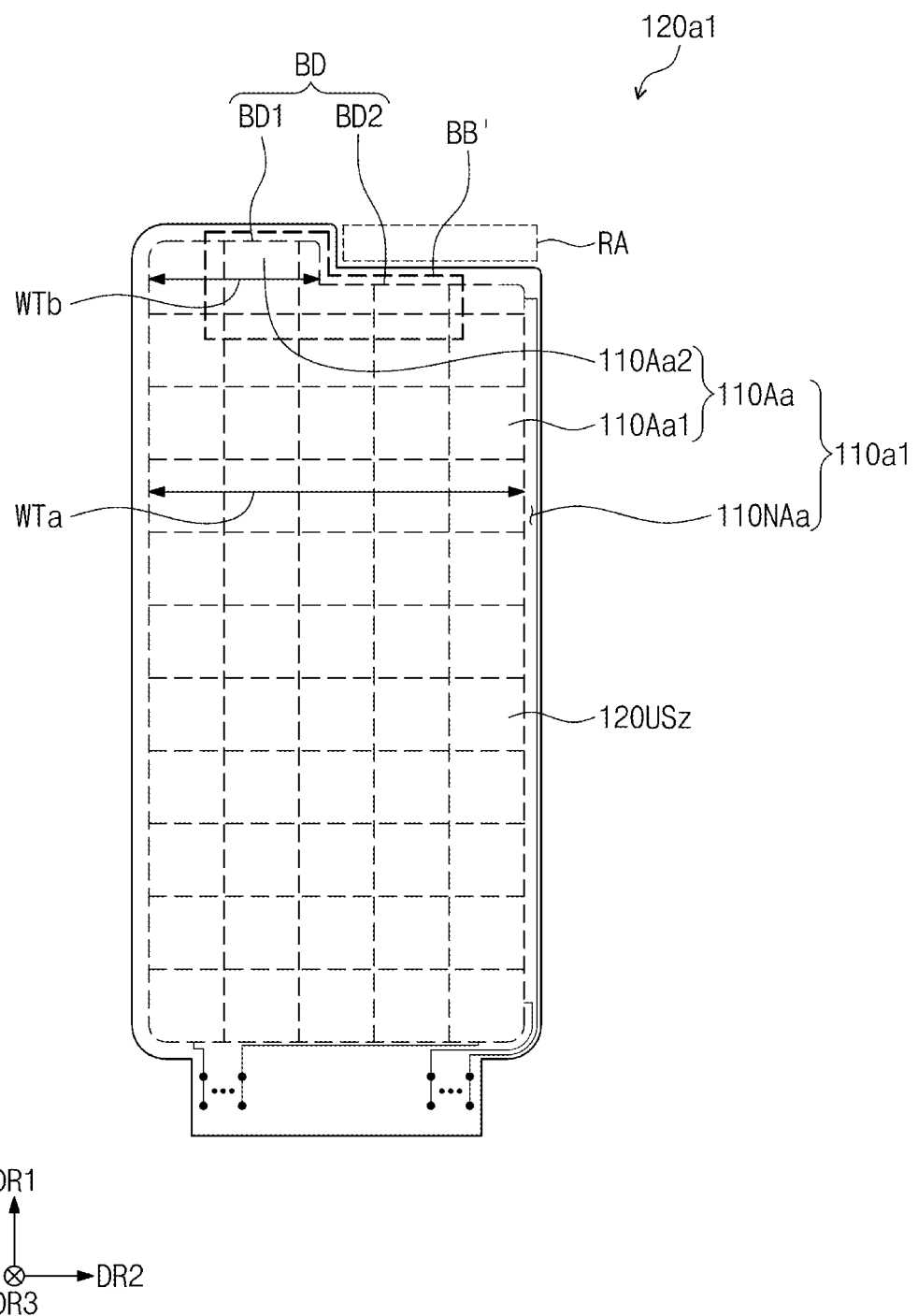
FIG. 20 is a plan view of a sensor layer according to an embodiment of the inventive concepts.

FIG. 20 is a plan view of a sensor layer according to an embodiment of the present invention.

Referring to FIG. 20, a sensor layer 120*a*1 may have a shape corresponding to that of a display layer 110*al*. A display area 110Aa and a non-display area 110NAa may be defined on the display layer 110*al*.

The display area 110Aa may include a first display area 110Aa1 and a second display area 110Aa2. The second display area 110Aa2 may be defined as a portion protruding from the first display area 110Aa1 in the first direction DR1. A width WTa of the first display area 110Aa1 in the second direction DR2 may be greater than a width WTb of the second display area 110Aa2 in the second direction DR2.

A transmission area RA may be defined on the sensor layer 120*a*1 and the display layer 110*al*. The transmission area RA may be defined to be spaced apart from the display area 110Aa. The second display area 110Aa2 may be adjacent to the transmission area RA in the second direction DR2. That is, a predetermined space in which the sensor is to be disposed, for example, a space expect for the transmission area RA may be implemented as the display area 110Aa.

A boundary between the display area 110Aa and the non-display area 110NAa may include a first boundary portion BD1 and a second boundary portion BD2. The first boundary portion BD1 may extend along a predetermined direction. For example, the first boundary portion BD1 may extend along the second direction DR2. The second boundary portion BD2 may be a portion adjacent to the transmission area RA. Thus, the second boundary portion BD2 may have a shape corresponding to that of the transmission area RA. The second boundary portion BD2 may be bent in a direction toward a center of the display area 110Aa.

Sensor units 120USz of the sensor layer 120*a*1 may be arranged along the first direction DR1 and the second direction DR2. Each of the sensor units 120USz may overlap the first display area 110Aa1, the second display area 110Aa2, or both the first display area 110Aa1 and the second display area 110Aa2.

Among the sensor units 120USz, the sensor unit disposed on an area adjacent to the transmission area RA may have a surface area less than that of the sensor unit spaced apart from the transmission area RA. Thus, the sensor unit disposed on the area adjacent to the transmission area RA may be defined to extend up to a portion overlapping the non-display area 110NAa.

Figure 21:
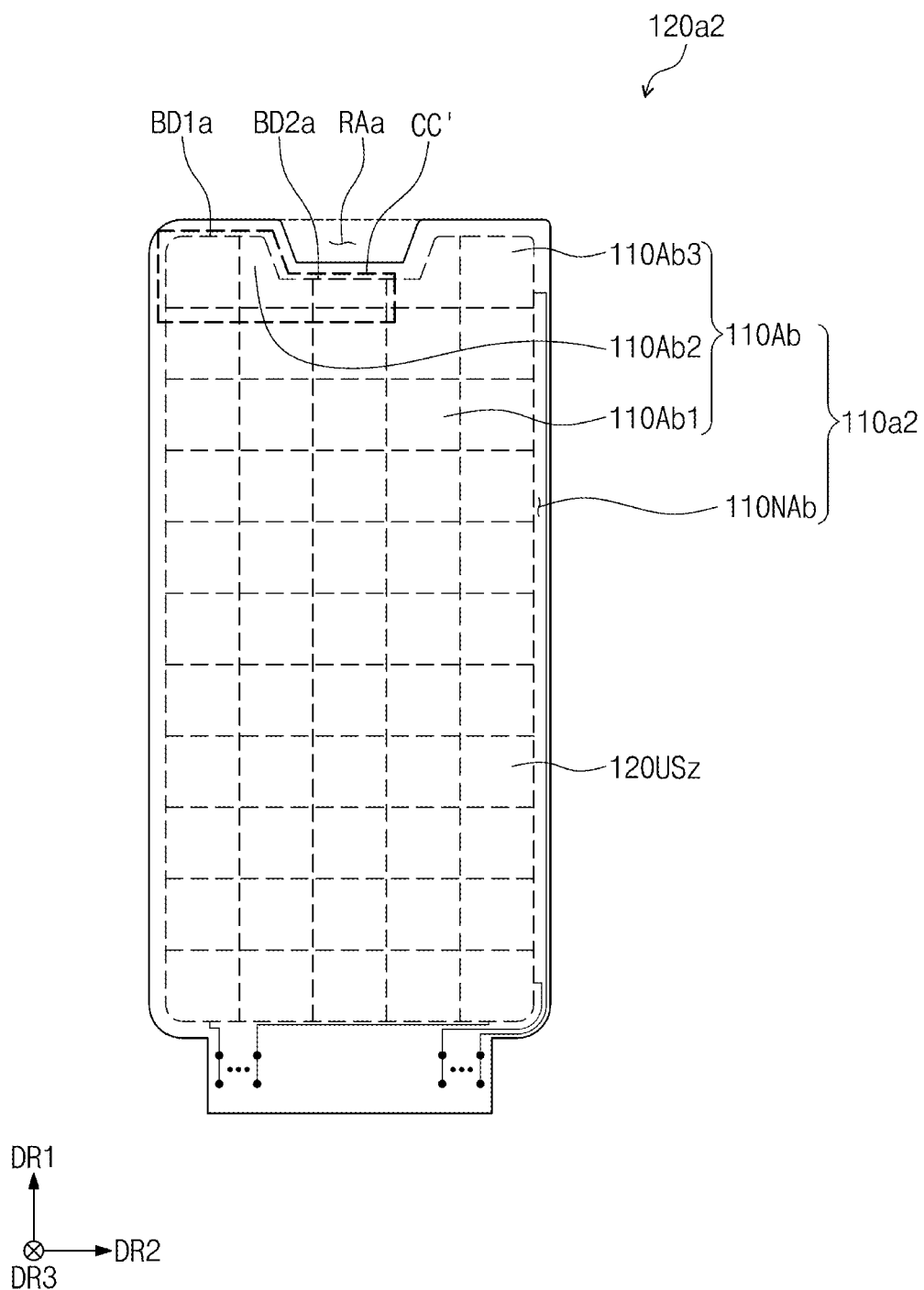
FIG. 21 is a plan view of a sensor layer according to an embodiment of the inventive concepts.

FIG. 21 is a plan view of a sensor layer according to an embodiment of the present invention.

Referring to FIG. 21, a sensor layer 120*a*2 may have a shape corresponding to that of the display layer 110*a*2. A display area 110Ab and a non-display area 110NAb may be defined on the display layer 110*a*2. The display area 110Ab may include a first display area 110Ab 1, a second display area 110Ab2, and a third display area 110Ab3. Each of the second and third display areas 110Ab2 and 110Ab3 may protrude from the first display area 110Ab1 in the first direction DR1. A width of the first display area 110Ab1 in the second direction DR2 may be greater than a width of each of the second display area 110Ab2 and the third display area 110Ab3 in the second direction DR2.

A transmission area RAa may be defined between the second display area 110Ab2 and the third display area 110Ab3. The transmission area RAa may be defined to be spaced apart from the display area 110Ab.

A boundary between the display area 110Ab and the non-display area 110NAb may include a first boundary portion BD1*a* and a second boundary portion BD2*a*. The first boundary portion BD1*a* may extend along the second direction DR2, and the second boundary portion BD2*a* may have a shape that is curved from the first boundary portion BD1*a* toward a center of the display area 110Ab.

Sensor units 120USz of the sensor layer 120*a*2 may be arranged along the first direction DR1 and the second direction DR2. Each of the sensor units 120USz may overlap the first display area 110Ab1, the second display area 110Ab2, the third display area 110Ab3, both the first display area 110Ab1 and the second display area 110Ab2, or both the first display area 110Ab1 and the third display area 110Ab3.

Among the sensor units 120USz, the sensor unit disposed on an area adjacent to the transmission area RAa may have a surface area less than that of the sensor unit spaced apart from the transmission area RAa. Thus, the sensor unit disposed on the area adjacent to the transmission area RAa may be defined to extend up to a portion overlapping the non-display area 110NAa.

FIG. 22 is an enlarged plan view illustrating a portion corresponding to an area CC' of FIGS. 20 and 21.

Referring to FIGS. 20, 21, and 22, a sensor units 120USz may include a first sensor unit 120USz1, a second sensor unit 120USz2, and a third sensor unit 120USz3. The first sensor unit 120USz1 may be referred to as a reference sensor unit. Sensing sensitivity of the first sensor unit 120USz1 may be reference sensing sensitivity.

Unlike the first sensor unit 120USz1, each of the second sensor unit 120USz2 and the third sensor unit 120USz3 overlapping the display area 110Aa or 110Ab may have a shape of which a portion is removed. To improve the sensing sensitivity of the second sensor unit 120USz2 and the third sensor unit 120USz3, each of the second sensor unit 120USz2 and the third sensor unit 120USz3 may be expanded up to an area overlapping the non-display area 110NAa or 110NAb. A width WT2z of the second sensor unit 120USz2 in the first direction DR1 may be greater than a width WT1z of the first sensor unit 120USz1 in the first direction DR1.

According to the embodiment of the inventive concepts, the sensor layer may include the first sensor unit and the second sensor unit. The first sensor unit may entirely overlap the display area of the display layer, and the second sensor unit may include the first portion overlapping the display area and the second portion overlapping the non-display area of the display layer. The first sensor unit may have the surface area greater than that of the first portion of the second sensor unit. According to the embodiment of the inventive concepts, the sensing sensitivity of the second sensor unit may be improved by extending the second portion of the second sensor unit up to the area overlapping the non-display area. Therefore, the non-uniformity in sensing sensitivity within the sensor layer may be eliminated, and the sensing layer having the improved sensing sensitivity may be provided.

It will be apparent to those skilled in the art that various modifications and variations can be made in the inventive concepts. Thus, it is intended that the present disclosure covers the modifications and variations of this invention provided they come within the scope of the appended claims and their equivalents. Hence, the real protective scope of the inventive concepts shall be determined by the technical scope of the accompanying claims.

What is claimed is:

1. A display device comprising:
 a display layer on which a display area and a non-display area adjacent to the display area are defined; and
 a sensor layer disposed on the display layer and comprising a plurality of sensor units configured to sense an input,
 wherein the plurality of sensor units comprise:
 a first sensor unit overlapping the display area; and
 a second sensor unit overlapping the display area and the non-display area,
 wherein the second sensor unit comprises a first portion and a second portion expanded from the first portion,
 a width of the second sensor unit in a first direction is greater than a width of the first sensor unit in the first direction,
 an area of the first portion is smaller than an area of the first sensor unit, and
 the first sensor unit and the second sensor unit are adjacent to each other in a second direction intersecting the first direction.

2. The display device of claim 1, wherein a hole is defined in the sensor layer, and
 the first portion of the second sensor unit comprises an edge extending along a shape of the hole.

3. The display device of claim 1, wherein the first portion overlaps the display area, and
 the second portion overlaps the non-display area.

4. The display device of claim 1, wherein a width of the second sensor unit in the second direction is greater than a width of the first sensor unit in the second direction.

5. The display device of claim 1, wherein the sensor layer further comprises a plurality of sensing lines disposed on the non-display area, and
 the number of sensing lines facing the first sensor unit among the plurality of sensing lines is greater than the number of sensing lines facing the second sensor unit among the plurality of sensing lines.

6. The display device of claim 1, wherein the sensor layer further comprises a dummy pattern disposed on the non-display area, and
 the dummy pattern has a shape similar to that of the second portion.

7. The display device of claim 1, wherein each of the first sensor unit and the first portion of the second sensor unit comprises a bridge pattern, a first sensing pattern contacting the bridge pattern, a second sensing pattern contacting the bridge pattern, and a third sensing pattern spaced apart from the first sensing pattern and the second sensing pattern, and
 the third sensing pattern comprises a first portion overlapping the bridge pattern, a second portion extending from the first portion of the third sensing pattern and facing the first sensing pattern and the second sensing pattern, and a third portion extending from the first portion of the third sensing pattern and facing the first sensing pattern and the second sensing pattern.

8. The display device of claim 7, wherein the second portion of the second sensor unit comprises a first protrusion extending from the first sensing pattern toward an area overlapping the non-display area, a second protrusion extending from the second portion of the third sensing pattern toward an area, which overlaps the non-display area, and facing the first protrusion, and a third protrusion extending from the third portion of the third sensing pattern toward an area, which overlaps the non-display area, and facing the first protrusion.

9. The display device of claim 8, wherein the second protrusion is disposed between the first protrusion and the first sensing pattern, and
 the third protrusion is disposed between the first protrusion and the first sensing pattern.

10. The display device of claim 1, wherein each of the first sensor unit and the second sensor unit comprises a bridge pattern, a first sensing pattern contacting the bridge pattern, a second sensing pattern contacting the bridge pattern, and a third sensing pattern spaced apart from the first sensing pattern and the second sensing pattern,
 the third sensing pattern comprises a first portion overlapping the bridge pattern, a second portion extending from the first portion of the third sensing pattern to face the first sensing pattern and the second sensing pattern, and a third portion extending from the first portion of the third sensing pattern to face the first sensing pattern and the second sensing pattern, and
 a portion of the first sensing pattern of the second sensor unit, a portion of the second portion of the second sensor unit, and a portion of the third portion of the second sensor unit overlap the non-display area.

11. The display device of claim 1, wherein the plurality of sensor units comprise a third sensor unit overlapping the display area and the non-display area,
 the third sensor unit comprises a third portion and a fourth portion expanded from the third portion,
 the third portion has a shape that is the same as a shape of a portion of the first sensor unit,
 the first portion of the second sensor unit has a surface area greater than that of the third portion of the third sensor unit, and
 the second portion of the second sensor unit has a surface area less than that of the fourth portion of the third sensor unit.

12. The display device of claim 1, wherein a boundary between the display area and the non-display area comprises a first boundary portion and a second boundary portion connected to the first boundary portion,
 the first boundary portion extends in a predetermined direction, and
 the second boundary portion is bent from the first boundary portion toward a central portion of the display area.

13. The display device of claim 12, wherein the second sensor unit overlaps the second boundary portion,
 the first portion of the second sensor unit overlaps the display area, and
 the second portion of the second sensor unit overlaps the non-display area.

14. The display device of claim 1, wherein the display area comprises a first display area and a second display area protruding and extending from the first display area in the first direction, and
 a width of the first display area in a second direction intersecting the first direction is greater than that of the second display area in the second direction.

15. The display device of claim 14, wherein the second sensor unit overlaps at least one of the first display area or the second display area.

16. A display device comprising:
a display layer on which a display area and a non-display area adjacent to the display area are defined; and
a sensor layer disposed on the display layer and comprising a plurality of sensing electrodes,
wherein a transmission area that is completely surrounded by the display area is defined on the display layer and the sensor layer,
the plurality of sensing electrodes comprises a first sensing electrode adjacent to the transmission area and overlapping the display area and the non-display area, and a second sensing electrode spaced apart from the first sensing electrode,
a length of the first sensing electrode in a first direction is greater than a width of the display area in the first direction, and
the length of the first electrode in the first direction is greater than a length of the second sensing electrode in the first direction.

17. The display device of claim 16, wherein a portion of an edge of the first sensing electrode has a shape corresponding to that of the transmission area.

18. The display device of claim 16, wherein the second sensing electrode is spaced apart from the transmission area, and each of the first sensing electrode and the second sensing electrode extends along the first direction, and the first sensing electrode and the second sensing electrode are spaced apart from each other in a second direction intersecting the first direction.

19. The display device of claim 16, wherein the sensor layer further comprises a dummy pattern facing the second sensing electrode and overlapping the non-display area.

20. A display device comprising:
a display layer on which a display area and a non-display area adjacent to the display area are defined; and
a sensor layer disposed on the display layer and comprising a plurality of sensor units configured to sense an input,
wherein the plurality of sensor units comprise:
a first sensor unit overlapping the display area without overlapping the non-display area; and
a second sensor unit overlapping the display area and the non-display area,
wherein a hole is defined in the display layer and the sensor layer,
the first sensor unit is spaced apart from the hole with the second sensor unit therebetween,
the second sensor unit comprises an edge extending along a shape of the hole, and
an area of a portion of the second sensor unit overlapping the display area is smaller than an area of the first sensor unit.

* * * * *